(12) United States Patent
Chatterjee et al.

(10) Patent No.: US 7,688,953 B2
(45) Date of Patent: Mar. 30, 2010

(54) RATE CONTROL IN COMMUNICATIONS SYSTEMS

(75) Inventors: Saurav Chatterjee, San Jose, CA (US);
Paul Fullarton, San Jose, CA (US);
Hemendra Rana, San Jose, CA (US);
Steven D. Schramm, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 11/509,144

(22) Filed: Aug. 23, 2006

(65) Prior Publication Data

US 2007/0041557 A1    Feb. 22, 2007

Related U.S. Application Data

(63) Continuation-in-part of application No. 10/890,922, filed on Jul. 14, 2004.

(60) Provisional application No. 60/487,143, filed on Jul. 14, 2003, provisional application No. 60/710,998, filed on Aug. 23, 2005, provisional application No. 60/711,051, filed on Aug. 23, 2005, provisional application No. 60/711,053, filed on Aug. 23, 2005.

(51) Int. Cl.
*H04M 1/64* (2006.01)
*H04M 3/42* (2006.01)

(52) U.S. Cl. ............. 379/88.08; 379/88.11; 379/211.02

(58) Field of Classification Search ................ 379/88.8, 379/88.11, 211.02
See application file for complete search history.

(56) References Cited

U.S. PATENT DOCUMENTS

| | | | |
|---|---|---|---|
| 5,732,348 A | 3/1998 | Norimastsu | |
| 5,903,629 A | 5/1999 | Campbell | |
| 6,092,097 A | 7/2000 | Suzouka | |
| 6,147,977 A * | 11/2000 | Thro et al. | 370/265 |
| 6,272,214 B1 | 8/2001 | Jonsson | |
| 6,345,288 B1 | 2/2002 | Reed | |
| 6,351,656 B1 * | 2/2002 | Burgan et al. | 455/566 |
| 6,373,817 B1 | 4/2002 | Kung | |
| 6,424,711 B1 | 7/2002 | Bayless | |
| 6,751,297 B2 | 6/2004 | Nelkenbaum | |
| 6,754,181 B1 | 6/2004 | Elliott | |
| 6,920,486 B2 | 7/2005 | Kiiskinen | |
| 2003/0120593 A1 | 6/2003 | Bansal | |
| 2004/0248600 A1 | 12/2004 | Kim | |
| 2005/0041647 A1 | 2/2005 | Stinnie | |
| 2005/0068980 A1 | 3/2005 | Mathew | |
| 2005/0203673 A1 * | 9/2005 | El-Hajj et al. | 701/1 |
| 2005/0238148 A1 * | 10/2005 | Poustchi et al. | 379/88.17 |
| 2005/0272413 A1 | 12/2005 | Bourne | |
| 2006/0141982 A1 | 6/2006 | Timmins | |
| 2007/0022058 A1 | 1/2007 | Labrou | |

OTHER PUBLICATIONS

International Search Report for Application No. PCT/US06/33071 dated Apr. 20, 2007.
PCT International Search Report, International Application No. PCT/US2006/033181, Apr. 25, 2007.

(Continued)

*Primary Examiner*—Rasha S Al Aubaidi
(74) *Attorney, Agent, or Firm*—Tucker Ellis & West LLP

(57) ABSTRACT

Communications rate control is described. The rate control includes receiving a message addressed to a client device of a user. A determination is made as to a category of the message. Data of the message is synchronized between a server and the mobile device in response to one or more of the category and one or more user actions at the client device.

46 Claims, 14 Drawing Sheets

OTHER PUBLICATIONS

Written opinion of the International Searching Authority for Application No. PCT/US2006/033181.
PCT International Search Report, International Application No. PCT/US2007/000487, Oct. 18, 2007.
PCT International Search Report, International Application No. PCT/US2007/007064, Jun. 30, 2008.

* cited by examiner

RATE CONTROL IN COMMUNICATIONS SYSTEMS

RELATED APPLICATIONS

This application is a continuation-in-part (CIP) application of U.S. patent application Ser. No. 10/890,922, filed Jul. 14, 2004, which claims the benefit of U.S. Patent Application No. 60/487,143, filed Jul. 14, 2003.

This application claims the benefit of U.S. Patent Application No. 60/710,998, filed Aug. 23, 2005.

This application claims the benefit of U.S. Patent Application No. 60/711,051, filed Aug. 23, 2005.

This application claims the benefit of U.S. Patent Application No. 60/711,053, filed Aug. 23, 2005.

TECHNICAL FIELD

The disclosure herein relates generally to communication systems and, in particular, to wireless communication systems.

BACKGROUND

Mobile communications in today's real-time enterprise can be challenging. The problem is further complicated by changes in the workplace which have led to a more geographically dispersed and highly mobile workforce. In spite of the popularity of electronic mail (email), large numbers of people and employees still depend upon numerous other types of communications to collaborate with colleagues and drive business success. This is especially true for those in sales, service, operations and management roles who rely upon timely access to and coordination with colleagues as well as other employees, customers, partners and suppliers. Thus, communications remain an essential means of conducting business and staying in contact.

As a result of communications being so critical to business today, many professionals and enterprise employees now handle very large numbers of communications each business day. These communications can include disparate types of communications like emails, voicemails, instant messaging to name a few. Managing these large numbers and disparate types of communications consumes large amounts of time during the typical business day. For the growing number of people who spend a significant part of their day away from their offices or in meetings or other events, managing this large number of communications is highly time-consuming, frustrating and inefficient. Consequently, there is a need for communication systems that provide efficient, timely, and proactive real-time management of multiple types of communications.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

Communications rate control is described herein. The rate control includes receiving a message addressed to a client device of a user. A determination is made as to a category of the message. Data of the message is synchronized between a server and the mobile device in response to one or more of the category and one or more user actions at the client device.

In the following description, numerous specific details are introduced to provide a thorough understanding of, and enabling description for, embodiments of the communications systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

A communication system is provided herein that uses client-server architectures to improve the efficiency of multiple types of communications. The communication system, referred to herein as the active mobile collaboration (AMC) system, includes a facilitator. The facilitator of an embodiment is an application hosted on one or more servers or other processor-based devices, and communicates a portable or mobile communications device via one or more couplings. The facilitator communicates with the AMC client of a host portable device via a network coupling for example. The facilitator of alternative embodiments can be distributed among one or more portable processor-based devices including the same communication devices as the client application.

The AMC system also includes a client. The client, also referred to as the AMC client, is a component application of a variety of processor-based mobile communication devices and telephones. The components of the AMC system function to improve efficiency of communications by allowing communication device users to increase accessibility of enterprise and personal contact information from mobile phones and other personal digital assistants (PDAs), dynamically manage how and when mobile communications take place, intelligently screen messages, regardless of message type, based on identity of a messaging party, urgency, and subject matter, and determine which contacts in a directory are available to talk and which ones choose not to be disturbed, to name a few.

Figure 1:
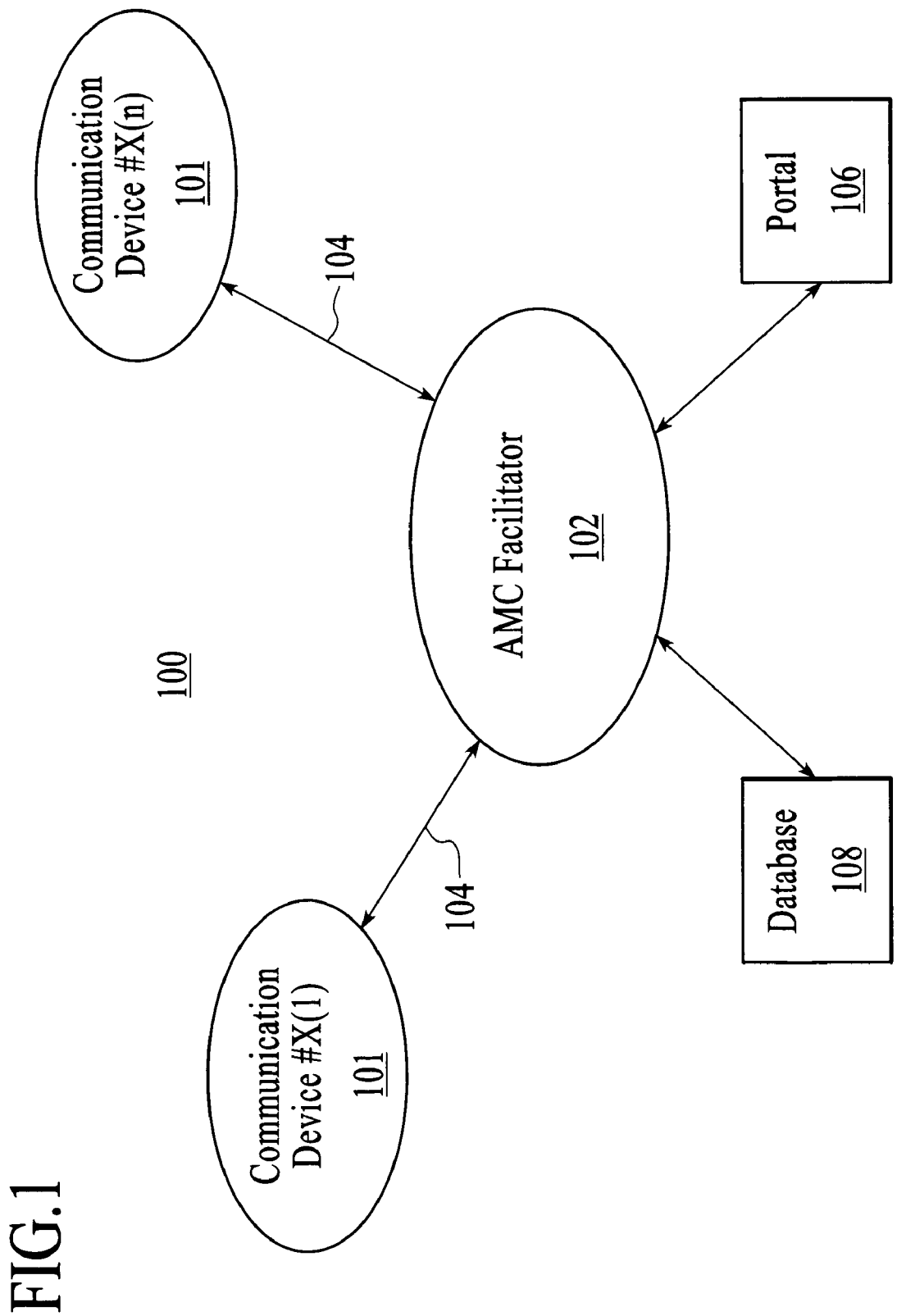
FIG. 1 is a block diagram of an active mobile collaboration (AMC) system, under an embodiment.

FIG. 1 is a block diagram of an active mobile collaboration (AMC) system 100, under an embodiment. The AMC system 100 includes any number X(n) of communication devices 101 coupled for communication via one or more facilitators 102 and one or more couplings 104. One or more of the communication devices 101 include an AMC client application. Likewise, the facilitator 102, also referred to herein as the AMC server 102, includes a facilitator application. The AMC client and facilitator function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones. The AMC system 100 of an embodiment also includes couplings with one or more portals 106 and/or one or more databases 108, but is not so limited.

The communication devices 101 and facilitators 102 described herein are processor-based components running or hosting numerous applications or programs. As such, the communication devices 101 and facilitators 102 can include one or more processors (not shown) coupled among any number/combination of components (not shown) known in the art, for example buses, controllers, memory devices, and data input/output (I/O) devices, in any number of combinations.

The communication devices 101 described herein include processor-based electronic devices, for example, cellular telephones, personal computers, portable computing devices, portable telephones, portable communication devices, subscriber devices or units, PDAs, mobile devices, wireless devices, wireline devices, voice over Internet Protocol (VOIP) devices, private branch exchange (PBX) devices, soft clients, and desktop clients to name a few. The communication devices 101, also referred to as handsets, client devices, mobile devices, mobile communication devices, and portable communication devices, can include all such devices and equivalents, and are not limited to the communication devices described above.

The couplings 104 include wired couplings, wireless couplings, and hybrid wired/wireless couplings, but are not so limited. Furthermore, the couplings 104 can include various networks and/or network components (not shown) of a communication service provider or carrier, but are not so limited. The network and corresponding network components, when present in the couplings 104, can be any of a number of network types known in the art including, but not limited to, local area networks (LANs), metropolitan area networks (MANs), wide area networks (WANs), proprietary networks, backend networks, and the Internet.

Figure 2:
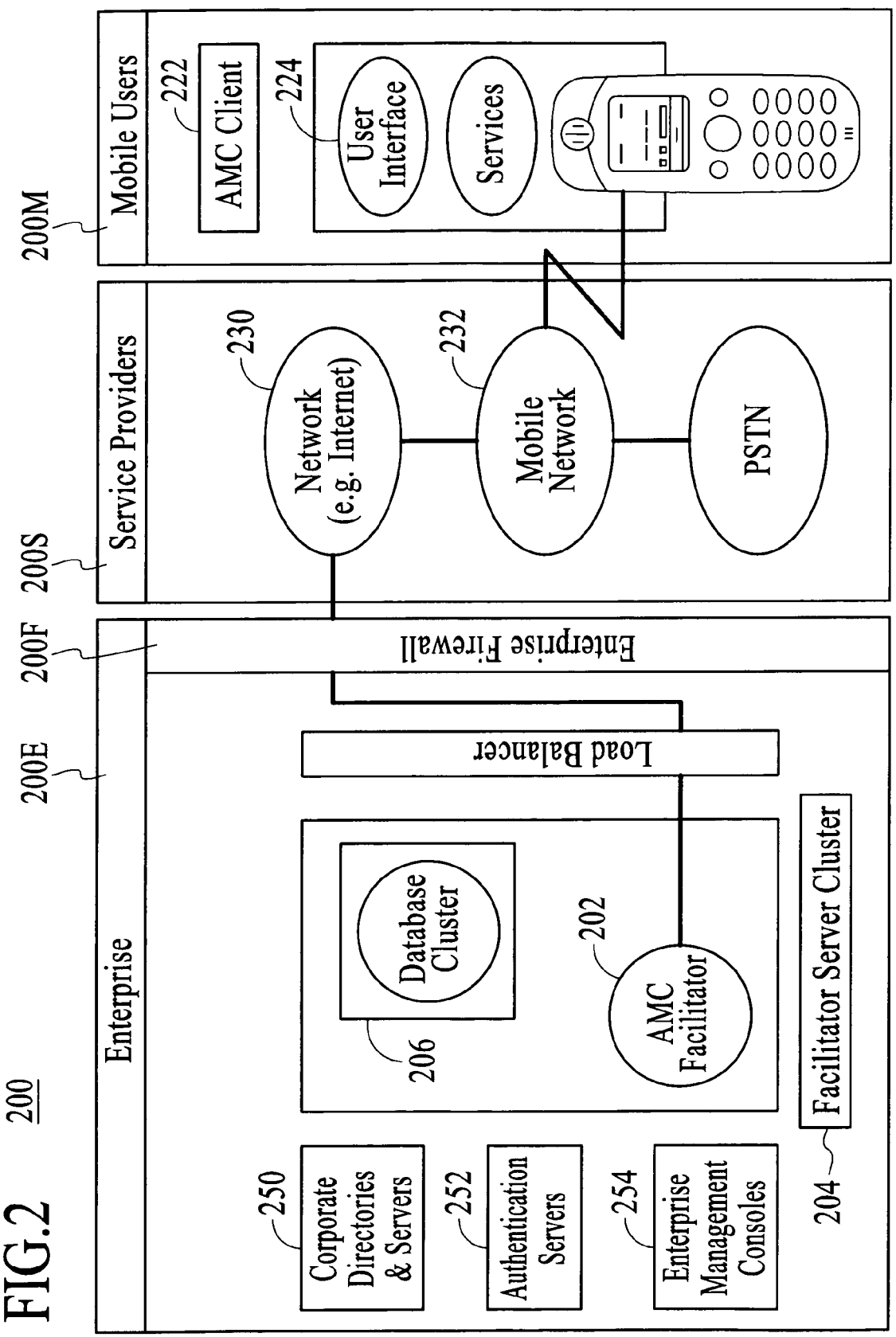
FIG. 2 is a block diagram of a communications system that includes an AMC system, under an alternative embodiment.

FIG. 2 is a block diagram of a communications system 200 that includes an AMC system, under an alternative embodiment. The AMC system includes a facilitator 202 and a client 222 as described elsewhere herein. The facilitator 202 can be one or more facilitators that form a facilitator server cluster 204 and/or database cluster 206 within the enterprise 200E that are resident behind the enterprise firewall 200F, but the AMC system is not so limited. The host enterprise 200E also includes numerous other components, for example, corporate directories and servers 250, authentication servers 252, and enterprise management consoles 254 to name a few. The facilitator 202 is an integrated component of the host enterprise 200E and as such integrates with one or more components of the enterprise 200E. For example, couplings between the facilitator 202 and messaging and collaboration servers (e.g. Microsoft® Exchange) and/or corporate or other directories of the enterprise 200E allow easy, over-the-air download of personal and corporate contact information to devices, as well as searching of personal and corporate contact directories from the device. Other information of the enterprise 200E can also be delivered to the devices using the AMC system, information including but not limited to calendar information, calendar alerts, calendar reminders, etc.

The facilitator 202 couples to a device of one or more users via one or more network couplings. As an example, the facilitator 202 couples to devices using one or more service provider networks 200S. In this example, the facilitator 202 couples to one or more service provider networks or infrastructures 200S via network couplings 230 (e.g. Internet), and then couples to devices 200M via the respective service provider networks 232. The AMC system protects data transfers between the facilitators 202 and the devices 200M using secure couplings, for example, protected with end-to-end security protocols like Secure Sockets Layer (SSL) or Transport Layer Security TLS cryptographic protocols.

The devices 200M of an embodiment include the AMC client 222. The AMC client 222, also referred to as the client 222, includes a graphical user interface 224 that integrates with the device applications and allows users to receive and scan enterprise information of the enterprise 200E. The enterprise information includes contact information, directory information, alerts that can include calendar reminders, conference notifications and call requests from colleagues, as described herein and in the Related Applications. Call requests include relevant details such as name, urgency, and subject matter to help users move business forward while screening out unwanted interruptions. The client 222 further provides a presence-aware phonebook that lets users find a contact and determine if the contact is available to talk, even before placing a call. The client 222 eliminates the need to manually enter contacts into the host device 200M. Instead, users download personal and/or corporate contact information over-the-air to their devices. The facilitator 202 and client 222 of the AMC system therefore provide automated, two-way synchronization to ensure contacts are backed up and up to date at the enterprise 200E.

An example of the AMC system of an embodiment is available as the Orative Enterprise Software from Orative Corporation of San Jose, Calif. The facilitator is available as the Orative Enterprise Server (e.g. runs on a standards-based, Java 2, Enterprise Edition (J2EE) platform that operates securely behind the enterprise firewall). The client is available as the Orative Client Software (e.g. runs on a variety of popular mobile devices, and leverages the latest application development environments including Symbian OS, Java and BREW to name a few).

While dynamically managing how and when mobile calls take place and intelligently screening calls based on numerous factors described above, the components of the AMC system also improve efficiency of voice communications by increasing accessibility of enterprise and personal contact information from mobile phones. Components of the AMC system of an embodiment support aggregation and management of contact information from various sources including, but not limited to, directories resident on desktop computers, corporate/enterprise directories, and contact information of the mobile device native phonebook, and provide data coupling between those sources and mobile devices hosting the AMC client. This contact information is managed by providing the user with access via the mobile device to dynamically integrated contacts of a contact list and a number of phonebooks from multiple sources. The dynamic integration of multiple disparate directories provided by the AMC system of an embodiment allows a user to indicate the contacts he/she desires among all directories of a corresponding enterprise server, and then dynamically synchronizes all enterprise directories so as to place the desired information from the directories together into a common AMC phonebook, as described in detail below.

Figure 3:
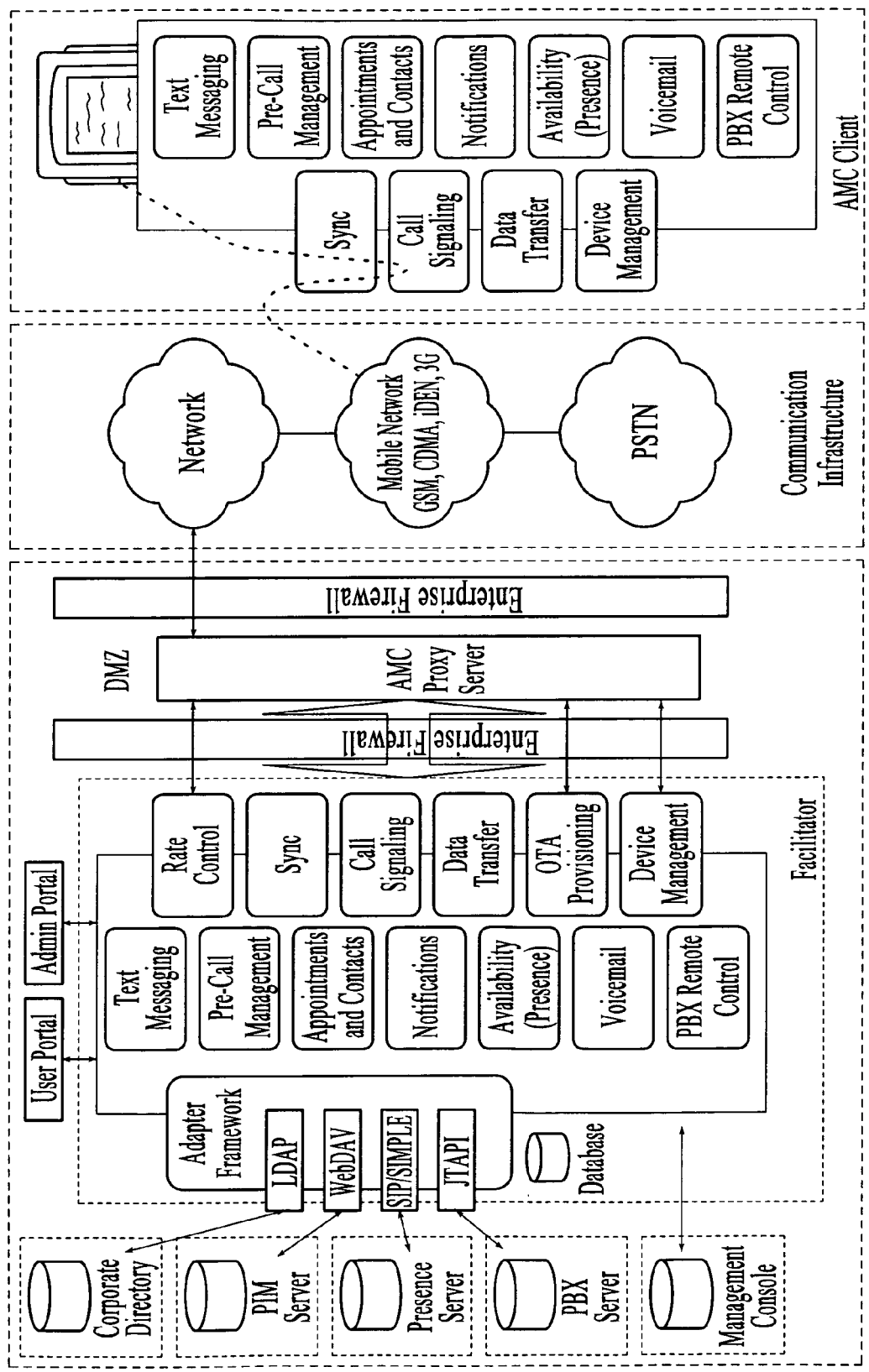
FIG. 3 is a block diagram of a communications system that includes an AMC system, under another alternative embodiment.

FIG. 3 is a block diagram of a communications system 300 that includes an AMC system, under another alternative embodiment. The communications system 300 includes enterprise components, with which the AMC system is integrated, coupled to client devices via a communication or network infrastructure. The enterprise components include, but are not limited to, one or more of a corporate directory, Personal Information Manager (PIM) server, presence server, Private Branch Exchange (PBX) server, and management console.

The AMC system includes a facilitator as described herein. The facilitator includes an adapter or adapter framework by which the facilitator simultaneously integrates with components of the enterprise and enterprise servers. The facilitator uses an adapter for each directory server to which it integrates. The adapter of an embodiment is a protocol-specific adapter for each directory server to which it integrates; alternatively, the adapter includes vendor-specific adapters. The facilitator integrates with multiple directories simultaneously, including Lightweight Directory Access Protocol (LDAP)/Active Directory, Exchange, Domino, and third-party instant message (IM)/presence server buddy-lists. The AMC adapters convert the data from the enterprise directories (e.g. external) into a common data structure. The converted data is coalesced together into a single directory presented to the user on device via the client. The single directory generated from the data of multiple directories is referred to as the AMC phonebook.

The facilitator includes one or more applications that support multiple functions provided by the AMC system. The AMC system functions include, but are not limited to, test messaging, pre-call management, appointments and contacts, notifications, availability (presence), voicemail, and PBX remote control.

The facilitator couples to a mobile device of one or more users via one or more network couplings or infrastructures. As an example, the facilitator couples to a mobile network using a coupling with another communications network (e.g. Internet). The mobile network or mobile infrastructure, which includes one or more service provider networks associated with respective ones of the mobile devices, provides a coupling to individual mobile devices.

Communications between the facilitator and the mobile device are controlled by the facilitator using one or more components and applications. The functions provided by the facilitator in controlling communications include one or more of rate control, synchronization (sync), call signaling, data transfer, OTA provisioning, and device management to name a few. Optionally, the communications path between the facilitator and the communications network includes an AMC proxy server.

The AMC system of an embodiment includes a protocol for use in managing and synchronizing connections between two endpoints, where the protocol is implemented by the rate controller of the facilitator. The endpoints include any combination of mobile devices including an AMC client and/or facilitators (e.g. two mobile devices, a mobile device and a facilitator, two facilitators, etc.) as described herein. The mobile device and facilitator described above with reference to FIGS. 1-3 provide example embodiments of the endpoints, but the endpoints are not so limited. The protocol supports numerous types of data and multiple character sets and languages. Furthermore, the protocol is independent of the transport protocol and runs on top of numerous protocols including HTTP, TCP, UDP, SIP, and WAP, as described above.

The states of the protocol include connection establishment, capability negotiation, login, synchronization (data transfer), logout, and connection tear-down, but are not so limited. In the synchronization state, data transfer occurs between two endpoints subsequent to a synchronization event determined by the rate controller; the previous stages necessary for synchronization also occur before data transfer can begin if these stages have not been completed successfully. The rate controller of an embodiment is a component or application of the facilitator (FIG. 3) but is not so limited. A synchronization event occurs when the rate controller determines a set of criteria have been met for a connection to occur. The rate controller therefore controls or limits the number of times the AMC client transfers data to a facilitator, and vice versa, over a wireless network, thus reducing the number of messages transmitted between the endpoints, limiting data charges, and possibly alleviating device battery usage. The rate controller provides control on contacts, notifications, and any type of data between any two endpoints, and especially presence and availability updates, which account for significant data usage and charges and battery life on mobile devices. The rate control criteria can be per user, per device type, and/or per service provider to name a few.

The rate controller intelligently synchronizes traffic or message flow between the facilitator and the mobile device in order to control when data, and what data, is transferred between the enterprise server and the mobile device. The control or synchronization is based on numerous factors that include content type of the message and the context of the device. Furthermore, the rate control or synchronization can be based on factors that include, but are not limited to, user preferences, message subject, message timeout (expiry), availability of message sender and/or recipient, presence of message sender and/or recipient, reachability of message sender and/or recipient, level of user activity, organizational level of message sender and/or recipient, number of message recipients, roles of message recipients, type of message (e.g. broadcast message), number of queued messages, age of messages, date, calendar, time of day, combination of time due and current time, service provider policies, device capabilities and/or limitations, size of message, load on system (e.g., AMC, service provider, enterprise, etc.), customer preference based on service provider service plan (e.g. roaming), desktop activity, and number of contacts.

Communication synchronization based on content of messages in an embodiment uses content of outbound message traffic from the enterprise server to the mobile device, but is not so limited. The context of the mobile device includes information of user activities on the mobile device like, for example, navigation in an application on the mobile device, if the screen light is on, if the screen lid is open, idle time after key press, etc. The rate controller can be used in any network or communication network (e.g. mobile communication networks, satellite communications networks, data networks, etc.) in which there is a need to conserve scarce resources (e.g. expensive, low bandwidth, system capacity, battery, etc.).

In addition to message type and device context, the rate controller of an embodiment, as described below, synchronizes traffic according to different mechanisms based on the type of connection between the mobile device and the enterprise server. The presence information of an embodiment for all other users is organized into four (4) categories or types of presence status. These different types of presence status include watcher, active, standby, and background, as described below. In an embodiment, the presence status used by the rate controller corresponds to the types of phonebooks or phonebook contacts of the AMC system, but an embodiment is not so limited.

The rate controller of an embodiment determines when to synchronize and what to synchronize. The rate controller includes two queues, referred to herein as an allow queue and a block queue. Generally, different policies of the rate controller are defined by specifying which message types get placed in particular queues of the rate controller, where placement in a queue of an embodiment is dynamic. Using an example rate controller policy, the rate controller immediately synchronizes all data of messages placed or included in the allow queue, while messages placed in the block queue are queued up by the rate controller but do not result in immediate initiation of synchronization.

In the rate control policies of an embodiment, system-defined high priority messages are directed or placed in the allow queue. The high priority messages of an embodiment include, for example, text messages, call requests, contact updates, notifications, and call logs, but can include other message types. The generation of high priority messages therefore initiates synchronization because of their placement or assignment to the allow queue.

Messages relating to presence and availability updates, which are the most frequent message type in an embodiment, are placed in different queues at different times according to presence status information. Therefore, for each user X, presence information of an embodiment for all other users is organized into four (4) categories or types of presence status. One presence status is watcher, and watcher status is assigned to other users whose presence status is actively watched by user X. Another presence status is active, and active status is assigned to other users with whom user X recently communicated within a pre-specified and dynamically configured period of time. Another presence status is standby, and standby status is assigned to other users manually included in the AMC phonebook of user X. A further presence status is background, and background status is assigned to all other users with presence information. The presence status can also determine or correspond to a phonebook of the AMC system in which contact information of other users are placed, as described below, but the embodiment is not so limited.

The rate controller is configured to provide different rate control policies based on client platforms, networks, and service providers. As example rate control policies, a user behavior-based control policy is used for persistent connections (e.g. between the server and the client device) and a message-based control policy is used for non-persistent connections; other rate control policies can be used in alternative embodiments. Each of the user behavior-based control policy and the message-based control policy are described in detail below.

Figure 4:
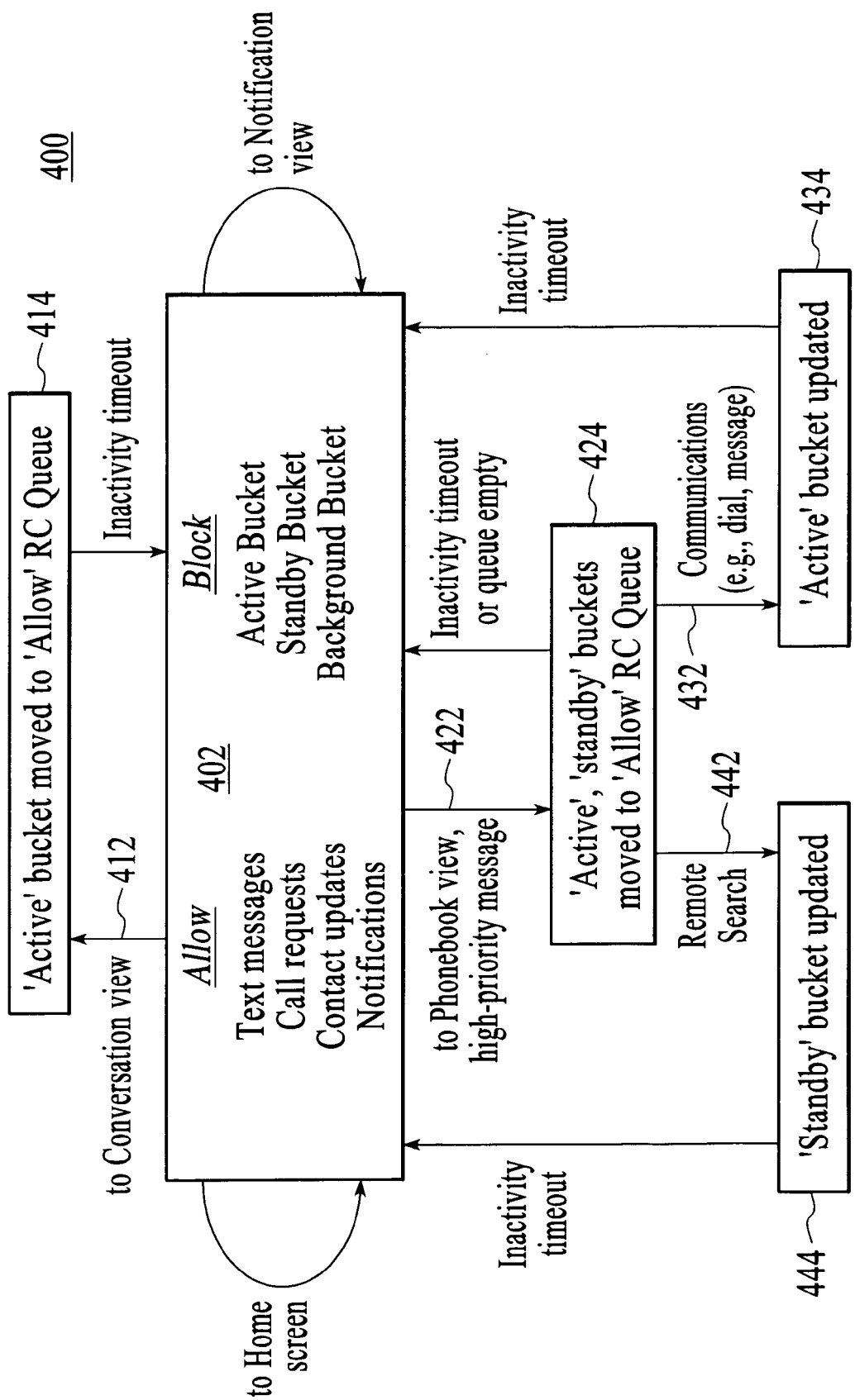
FIG. 4 is a flow diagram of the behavior-based rate control policy, under an embodiment.

The behavior-based rate control policy is an aggressive presence and availability update limiter that, while maximizing battery life of mobile devices, uses quick interaction between the client of the mobile device and the facilitator. FIG. 4 is a flow diagram of the behavior-based rate control policy 400, under an embodiment. The default state 402 of the behavior-based rate control policy places high priority messages (e.g. text messages, call requests, contact updates, call screen alerts, notifications, call logs, messages of presence of type watcher, etc.) in the allow queue. Messages of other presence status (e.g. active, standby, background) are considered of relatively lower priority and are therefore placed in the block queue. The default state 402 control policy applies when the handset is not being used, and this results in only high priority messages of the allow queue initiating synchronization.

The context of the mobile device includes information of user activities on the mobile device like, for example, navigation in an application on the mobile device, if the screen light is on, if the screen lid is open, idle time after key press, etc. This information is conveyed to the AMC server from the AMC client.

The AMC client comprises three UI screens: a main status screen, where the user may change his/her presence; the conversation screen, where the user may see a log of his/her conversations (be it via text messaging, calls, voice mail, call requests) with other users and these user's presence information; and the phonebook screen, where the user may see a list of his/her corporate and personal contacts and their presence information.

When the user navigates 412 to the "conversation" screen of his/her mobile device, which shows the user's recent communications log (e.g. for calls, text messages, call requests), the AMC client notifies the server of this activity. The server changes to this new state and remains in this state until an inactivity timeout. In this state, all presence status messages having an active status are placed in the active queue. All presence status messages in the block queue having an active status are moved to the active queue. Any message in the active queue initiates synchronization 414.

When the user navigates 422 to the "phonebook" screen of his/her mobile device, the AMC client notifies the server of this activity. The server changes to this new state and remains in this state until an inactivity timeout. In this state, all presence status messages having an active or standby status are placed in the active queue. All presence status messages in the block queue having an active or standby status are moved to the active queue. The synchronization 424 therefore results in synchronization of presence and availability information for other users having either of active or standby status.

In one variant of this embodiment, operations under the behavior-based rate control policy also include synchronizing 424 presence and availability information for other users having active or standby status in response to generation 422 of a high-priority message. Therefore, when the user receives or generates 422 a high-priority message, the AMC server or client, respectively, simultaneously or subsequently initiates synchronization 424 to the other endpoint. The synchronization 424 initiated as a result of high-priority message generation includes moving the presence status messages from the block queue to the active queue for AMC contacts having either of active or standby status. The generation 422 of high-priority messages therefore initiates synchronization because of their placement or re-assignment to the allow queue.

Figure 5:
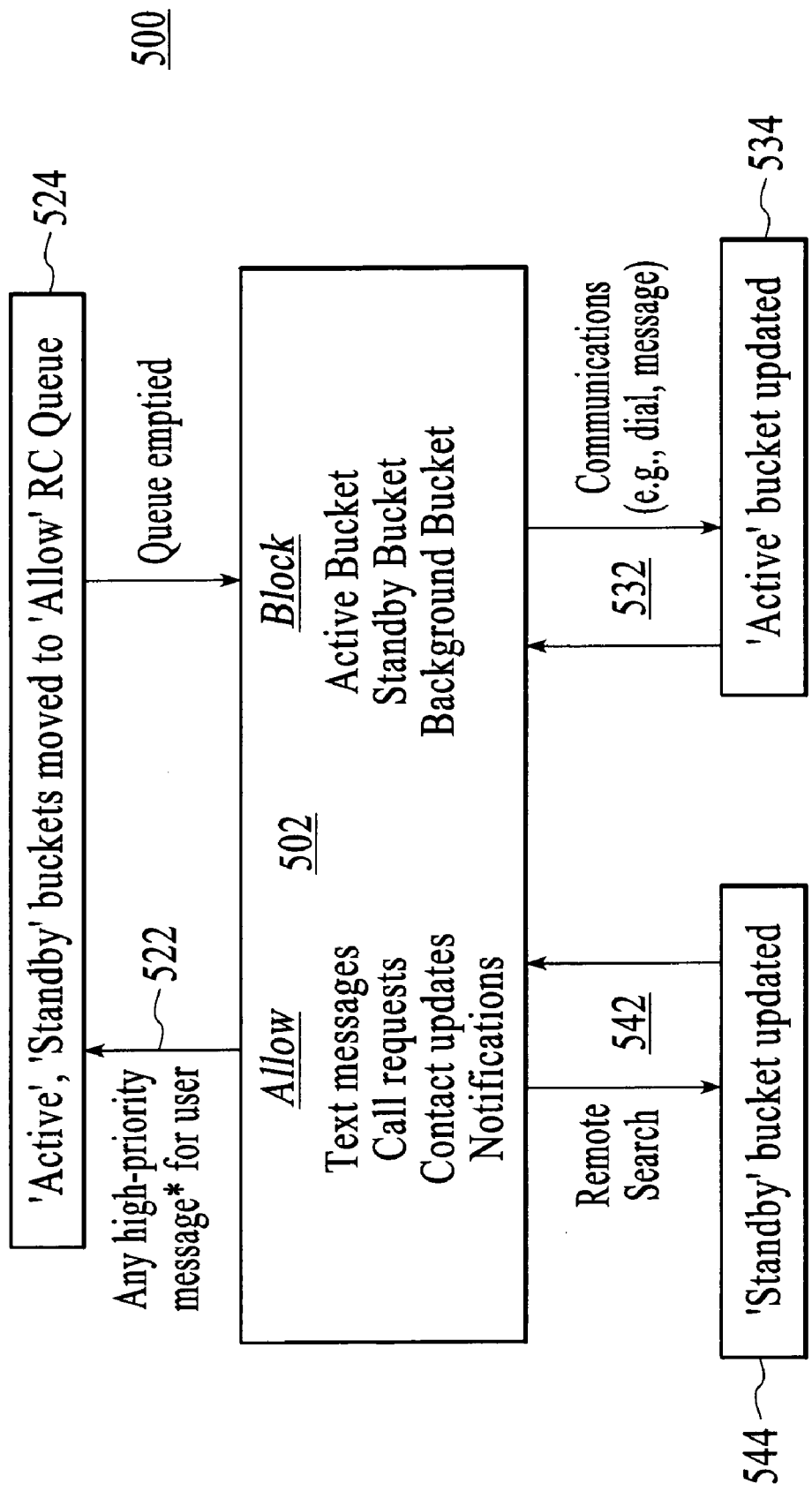
FIG. 5 is a flow diagram of the message-based rate control policy, under an embodiment.

The message-based rate control policy is configured for use on mobile device, for example, mobile devices using BREW or J2ME operating systems. FIG. 5 is a flow diagram of the message-based rate control policy 500, under an embodiment. The default state 502 of the message-based rate control policy places high priority messages (e.g. text messages, call requests, contact updates, notifications, call logs, etc.) in the allow queue. Messages of presence status (e.g. active, standby, background) are considered of relatively lower priority and are therefore placed in the block queue regardless of presence status. The default state 502 control policy applies when the handset is not being used, and this results in only high priority messages of the allow queue initiating synchronization.

Operations under the message-based rate control policy also include synchronizing 524 presence and availability information for other users having active or standby status in response to generation 522 of a high-priority message. Therefore, when the user generates 522 a high-priority message using his/her mobile device, the AMC client simultaneously or subsequently initiates synchronization 524 of the mobile device. The synchronization 524 initiated as a result of high-priority message generation includes moving the presence status messages from the block queue to the active queue for AMC contacts having either of active or standby status. The generation 522 of high-priority messages therefore initiates synchronization because of their placement or re-assignment to the allow queue.

The AMC system of an embodiment updates the presence and availability messages for example during one or more of communication events 532 (e.g., dialing, text messaging) and during remote search 542. In one embodiment, presence and availability messages for contacts having an active status are updated 534 in response to a communications event 532. Furthermore, presence and availability messages for contacts having a standby status are updated 544 in response to a remote search request or action 542. In an alternative embodiment, presence and availability messages for contacts having either active status or standby status are updated 534 and 544 in response to a communications event 532.

While particular behavior-based 402 and message-based 502 rate control policies are described above, these policies are intended only as examples as other rate control policies are contemplated under the disclosure herein. Rate control policies of alternative embodiments, therefore, can be configured for use in various types of communications systems (e.g. cellular, WiFi, etc.) and/or under multiple protocols.

Figure 6:
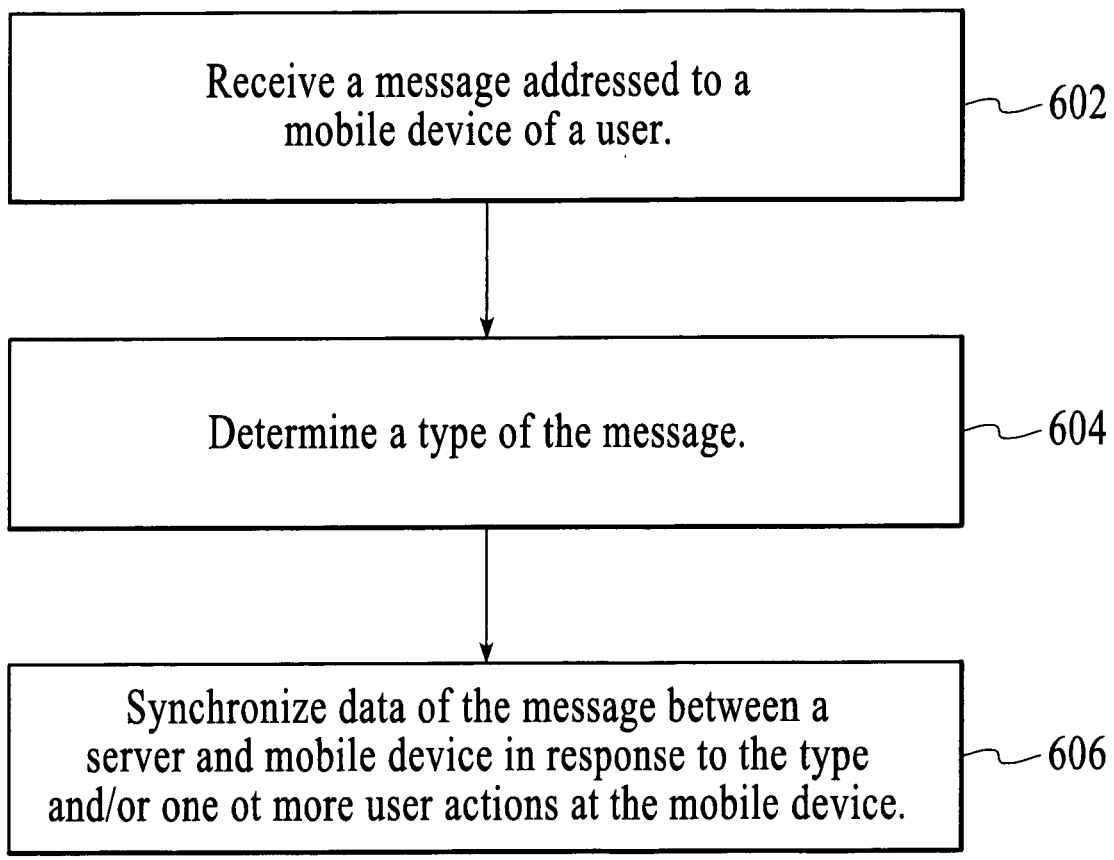
FIG. 6 is a flow diagram of communications rate control, under an embodiment.

As a more general example, FIG. 6 is a flow diagram of communications rate control 600, under an embodiment. The rate control 600 includes receiving 602 a message addressed to a mobile device of a user. A determination 604 is made as to a type of the message. Data of the message is synchronized 606 between a server and the mobile device in response to one or more of the type and one or more user actions at the mobile device.

Figure 7:
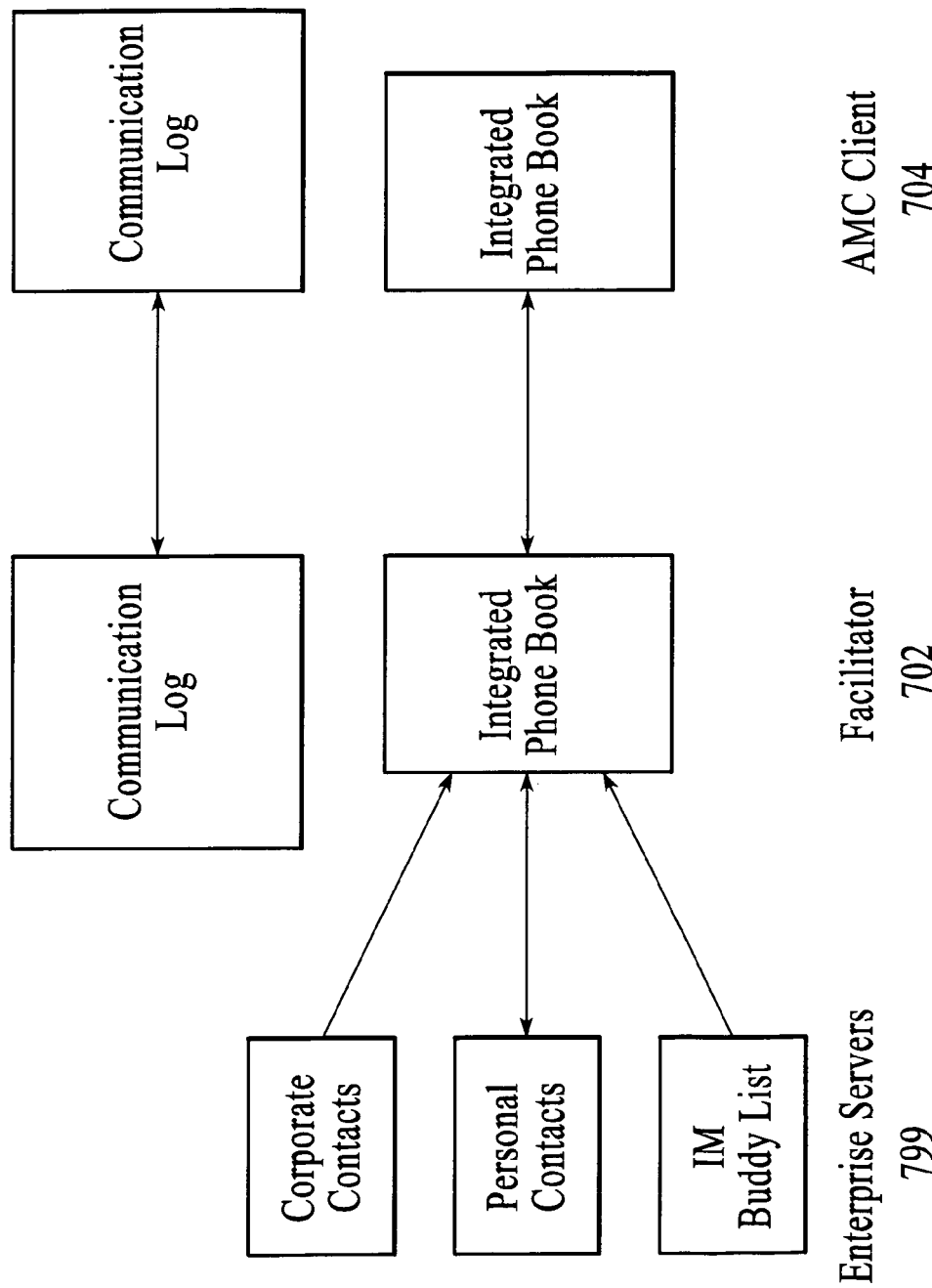
FIG. 7 is a block diagram of a contact data structure of the AMC system, under an embodiment.

The AMC system described above integrates contacts and contact information from multiple directories or contact lists. FIG. 7 is a block diagram of a contact data structure of the AMC system, under an embodiment. The data structure includes a communications log and an integrated phonebook on the facilitator 702 (e.g. appointments and contacts module of the facilitator (FIG. 3)) for each user. The integrated phonebook of the facilitator 702 receives or exchanges information with directories of one or more enterprise servers 799 for that user, the directories including corporate contacts, personal contacts, and instant messaging (IM) buddy lists, for example.

The client 704 also includes a communications log and an integrated phonebook, each of which are coupled to the respective data structures of the facilitator. The contact information of the integrated phonebook is stored in an application and/or memory area of the client device that includes the native phonebook of the client device, but can be stored in other memory areas of/available to the client device. Addition, modification, and/or deletion of contacts in the integrated phonebook reflect in the native phonebook of the client device, but are not so limited. Likewise, addition, modification, and/or deletion of contacts in the native phonebook of the client device are reflected in the integrated phonebook, but are not so limited.

The integrated phonebook of an embodiment includes a collection of contact objects, each of which represents a contact, whether one or more of corporate, personal and/or buddy list. The contacts in the integrated phonebook are a subset of contacts found in the enterprise servers. The integrated phonebook is specific to each user but is not so limited. The contacts in the integrated phonebook are selected manually, for example, by the user via one or more of the client and a user portal of the facilitator 702. Contacts are thus moved in and out of the integrated phonebook manually by the user through use of the user portal and/or from the client device (via remote search and add to phonebook; or delete from phonebook). Contacts with additional AMC context information may be indicated with an icon contact (e.g., availability, accessible communication modes), but are not so limited.

Contacts are added and removed from the communications log by the AMC system based on activity, including call requests, text messages, emails, voicemails, incoming phone calls, and/or outgoing phone calls. The communications log includes contacts are displayed chronologically, then alphabetically by name, in the communications log along with an icon that shows the AMC context information for the contact (e.g., availability, accessible communication modes), but is not so limited.

Both the communications log and the integrated phonebook provide the ability to view (and modify in case of the integrated phonebook) contacts as well as to select one or more contacts from the contact list and then select desired AMC calling or communications features for the selected contacts. Both provide graphical indications of the availability state (i.e., contextual cues) of each AMC contact as defined by the currently active availability profile of that contact. The AMC system updates the context data in the communications log when any subscriber represented in the lists change his availability or presence state, where the updates of an embodiment occur the next time the AMC client 404 and facilitator 402 communicate following the change in availability or presence state.

As a general example of integration of contacts from disparate directories into a common directory, a directory is formed comprising contact information from disparate directories. The forming includes receiving contacts from multiple directories. The contacts represent or are formed under multiple data structures, with one data structure corresponding to one of the directories. The received contacts are converted into contact objects. The contact objects, each of which represents a contact, all include or are formed under a common data structure. An integrated directory is generated or formed from the contact objects. The integrated directory thus includes a set of contacts of the disparate source directories.

With reference to FIG. 3, the facilitator of an embodiment uses the synchronization protocol (sync) to synchronize the integrated phonebook on the facilitator with the integrated phonebook on one or more clients on which the user logs in to the system. The adapters use different protocols to fetch contacts from applications of the enterprise servers and convert the contacts into contact objects; for example, LDAP is used to fetch contacts from Microsoft Active Directory, Web-based Distributed Authoring and Versioning (WebDAV) is used to fetch contacts from Microsoft Exchange, and SIP/SIMPLE is used to fetch contacts from instant message (IM) buddy lists. The facilitator of an alternative embodiment can include other adapters as appropriate to a configuration of the host enterprise server. An embodiment tracks only contacts in the AMC phonebook but is not so limited. Non-AMC contacts in the third-party directory servers are outside the purview of the AMC system and are therefore referred to as "background" contacts.

New contacts can be added to the entries in the integrated phonebook. The addition of the new contacts includes referencing existing contacts in one or more of the enterprise servers. The addition of contacts can also include adding one or more new personal contacts from the client, where the new contacts from the client are then stored in the personal contacts server as a new personal contact.

In addition to the contacts, presence and availability information is added to the directory for all users in these directories who are also AMC users. Presence and availability information can be referenced from an external presence server and/or generated and maintained internally within the facilitator. Presence and availability information can be transmitted for contacts in both the communications log and the integrated phonebook, because there may be overlap between communication log and integrated phonebook contacts, presence and availability for each contact should be transmitted only once). The facilitator of an alternative embodiment transmits presence and availability information relating only to contacts in the communications log; this significantly reduces the number of presence updates and aids in scalability, without significantly sacrificing user needs for presence and availability updates.

The AMC system communication log and integrated phonebook can be viewed as layers but is not so limited. The rate controller of the facilitator uses the layered phonebook concept to intelligently transfer data between the facilitator and the client. In addition to the integrated phonebook, the communications log comprises contacts of others with whom the user has recently communicated. The contacts of the communications log can overlap with contacts in one or more of the integrated phonebook, the enterprise directories, and background contacts, but may also include contacts that are not in any directory.

The layered directory provides, on phones with limited memory and relatively lower network bandwidth for example, efficient use of available memory and bandwidth through manual selection of a subset of contacts to synchronize from the server to the client devices. Further, regarding presence and availability updates for contacts, the layered directory allows the facilitator to update presence and availability information for a pre-specified contact type (e.g. contacts in the communication log) independent of contact in other directory lists, thereby providing for significantly reduced network traffic between the server and the client and also between servers (e.g., in a cluster). This structured updating of presence and availability updates therefore functions according to a temporal locality principle under which contacts with whom the user has recently communicated are most probably the ones whose availability and presence would be important to the user at any given time.

The communications log configuration can be augmented to include static and dynamic entries. Static entries are manually designated by the user and remain in the communications log even if there has not been communication with that contact for some period of time, while dynamic entries would be added and dropped by the system based on communication patterns. The communication pattern algorithm of an embodiment is based not only on recent communications but also on the history and/or type of communications (e.g., if a contact appears and drops from the communications log sporadically, the system may decide to simply keep the contact in the phonebook for longer durations).

The dynamic integration of multiple disparate directories provided by the AMC system of an embodiment dynamically synchronizes all enterprise directories so as to place or integrate contact information designated by a user from the disparate directories together into a common AMC phonebook. Following formation of the "common" directory of desired contact information from subsets of data from the enterprise directories, the AMC system of an embodiment allows user searching of the common directory. Thus, the AMC system provides for searching of multiple directories with one common input.

The searching provide by the AMC system includes remote searching and local searching. Local searching is performed against the local integrated phonebook on a client device. In contrast, remote searching is performed against one or more directories of the enterprise server (e.g. corporate directory, etc.). The local directory on the client device therefore effectively functions like a cache of information of one or more of the directories of the enterprise server, where the cache is stored locally on the client device, as described below.

The dynamic aggregation and management of contact information from multiple disparate sources provides client device users with access to accurate real-time contact information at their devices without the need for manually loading the information into the native phonebook of the client device. As an example, with reference to FIGS. 1-3, corporate/enterprise directory information is pushed to the facilitator, but the AMC system of alternative embodiments may receive the corporate/enterprise directory information via any number of methods known in the art. Due to limited processing resources on the client devices, however, not all contact data may be stored on the client devices. The AMC system provides convenient search and retrieve features from the client device to facilitate easy lookup of personal or corporate directory information, as described below.

Access to the aggregated contact information by a user of the AMC system is supported by the AMC client via search queries directed at all directory information to which the AMC system has access. The search queries are based on various combinations of name, including last name, first name, and partial name. Alternatively, rather than supplying the first few letters of the name into a field for a name-based search, the user may access an alphabetical display that accesses records corresponding with the first letter of the first or last name. Other search criteria or attributes of a contact or user upon which searching and sorting can be based in an embodiment, include but are not limited to presence, availability, location, email, phone number, network identification, title, profession company, department, location/facility, region, group affiliation (i.e. information assigned by a system administrator such as West Coast Sales Team, Account Team, Escalation Support Team, etc.), mailing list of which contact is a member, supervisor name, assistant, instant messaging address, children, spouse, notes, category, last active date, and other miscellaneous fields or information. This information can assist in the search for the appropriate contact, but completion of the fields is optional for any given search.

Search queries of an embodiment can include information in addition to or as a substitution of a contact name; for example, relational information that links to the contacts can be searched or returned in the search results. The relational data is tied to one or more of the identity, location, and/or other criteria of the contact. The relational data includes static information such as cities or location codes. The relational data also includes dynamic information such as the weather, stock information for the company associated with a contact, most recent order items of the contact, etc.

Upon completion of a search, components of the AMC system coalesces and then forward the results of the search to the user's client device for display, where the AMC system responds with search results that approximate the initial query as best as possible. Along with user name, other relevant details/cues are provided with each record to assist the user in identifying the appropriate contact. Examples of this include, but are not limited to, phone number, department, city/facility, and/or group affiliation. Preferences for this additional information are configured using the portal, described above. When a search results in multiple names fitting the search criteria, then the user has the ability to scroll and select the correct entry using the navigation keys. Additional contextual information, such as presence and available, from additional directories may be combined into the results.

The portal (FIG. 3) of an embodiment includes a browser-based search interface for use by the user when logged in to the portal during configuration and maintenance. The portal also supports easy selection of contacts from both personal phonebooks and corporate phonebooks to make these contacts available via the client device. The portal also allows the user to designate contacts from both personal phonebooks and corporate phonebooks as communications log entries that may appear in a priority order on the phone contact list.

Components of the AMC system support integration with numerous personal contact managers, for example Microsoft Outlook, Lotus Notes, and ACT to name a few. From a client device perspective, an end user has access to personal contact information (e.g., client device phonebook entries, desktop contact list in Outlook, etc.) as well as corporate contact information. The user can manage all of these contact databases as separate phonebooks rather than attempt to integrate them into one database.

The AMC system of an embodiment supports user-initiated information transfers (uploads and downloads) between contact managers and the facilitator. Further, the AMC system of an embodiment supports user-initiated information transfers (uploads and downloads) between the AMC client and the facilitator. The facilitator resolves duplicates and any discrepancies when new contacts are input to the facilitator from either a personal contact manager or the AMC client.

The AMC system of an embodiment further supports user creation, modification, and deletion of AMC subscriber groups (or consolidated contacts) as a permission-based feature via the portal, but is not so limited. Therefore, any user with permission can create groups. An individual creating a group in an embodiment is considered the sole owner of the group and the only person able to modify the group, but the embodiment is not so limited. The group owner as well as a system administrator can delete groups. Groups are viewed using either of the portal or a client device that includes an AMC client. Subscribers can upload group definitions to AMC client devices for use in communications logs and the general contact list, just like ordinary contacts.

Regarding a search algorithm of the AMC system of an embodiment, a user selects a name according to a [last first] format, and the search algorithm simultaneously or subsequently returns any user matching the input substring. The results are sorted in the following manner: names for which a substring of n characters matches exactly the FIRST n characters of the LAST name (the variable n represents a number 1, 2, . . . ); names for which a substring of n characters matches exactly the FIRST n characters of the FIRST name; and, all other substring matches in alphabetical order by last name.

For example, if a user searches for "er", the return order of names resulting from the search is as follows:
Erlanger, Buffy
Ermine, Foxy
Schwartz, Ernestine
Bistro, Bernie
Ferguson, Frumpy
Mercury, Freddy This example search provides one desired return order (Buffy and Foxy first, then Ernestine), and also allows the user two taps to type "mp" to immediately select "Frumpy."

Remote search can be configured to exclude contacts already in the integrated directory from being displayed in the results. Since remote search is typically used when a contact cannot be found in the integrated phonebook, this provides a useful filtering for most users. Further, the search result for one's own contact is also typically filtered out of the result, to again reduce clutter that are of less importance to the user.

The AMC system can choose to limit the number of search results returned to the client device based on user preference, AMC system settings and parameters, and/or based on characteristics of the enterprise directories being searched. When searching enterprise directories that limit search results or do not provide sorting controls that satisfy the sorting requirements of an embodiment, the AMC system can issue multiple related queries against the directory in order to return the most relevant set of limited results. In the embodiment described above, where results are sorted first by names that start with a particular substring, followed by names that include the substring, when searching a particular enterprise directory that limits results and does not provide for sorting control, the AMC can determine that a single search does not provide the most relevant set of limited results. For example, if a user searches for "e" in last name, and an enterprise directory returns at most five (5) results and sorts alphabetically, the returned names may be as follows:
Almaden, Frank
Alberts, Christine
Budke, Phil
Erlanger, Buffy
Ermine, Foxy The AMC system of an embodiment can determine that there are additional results that start with "e" and should be returned before some of the other results in the above list. In this example the AMC system can then issue a second query for only those names that start with "e" and properly combine and sort the results from both queries before aggregating, sorting, and limiting the results from all directories searched.

Using a search algorithm of the AMC system of another embodiment, a user selects a name a name according to a [first last] format, and the search algorithm simultaneously or subsequently returns any user matching the input substring. The results are sorted in the following manner: names for which a substring of n characters matches exactly the FIRST n characters of the FIRST name; names for which a substring of n characters matches exactly the FIRST n characters of the LAST name; and, all other substring matches in alphabetical order by first name.

For example, if a user searches for "er", the return order of names resulting from the search is as follows:
Ernestine Schwartz
Buffy Erlanger
Foxy Ermine
Bernie Bistro
Freddy Mercury
Frumpy Ferguson The search algorithms described above can be implemented both in the local search on the client device, remote search via the client device, and portal searches. However, there is a slight difference between the local search and the server searches (remote and portal) in that the server searches provide separate search criteria for first name and last name. Given the difference between local and server search criteria, the following adjustments are made to the search algorithm described above for server searches.

For server searches, using the first example described above (e.g., search a name according to a [last first] format), if a user searches for "er" in the last name, the return order of names resulting from the search is as follows:
Erlanger, Buffy
Ermine, Foxy
Ferguson, Frumpy
Mercury, Freddy Using the second example described above (e.g., search a name according to a [first last] format), if a user searches for "er" in the first name, the return order of names resulting from the search is as follows:
Schwartz, Ernestine
Bistro, Bernie If a user enters a query that searches for "er" in both names, no names are returned as none of the names have "er" in both the first and last name. Further, when a user searches for "e" in both names, the return would be "Mercury, Freddy."

Figure 8:
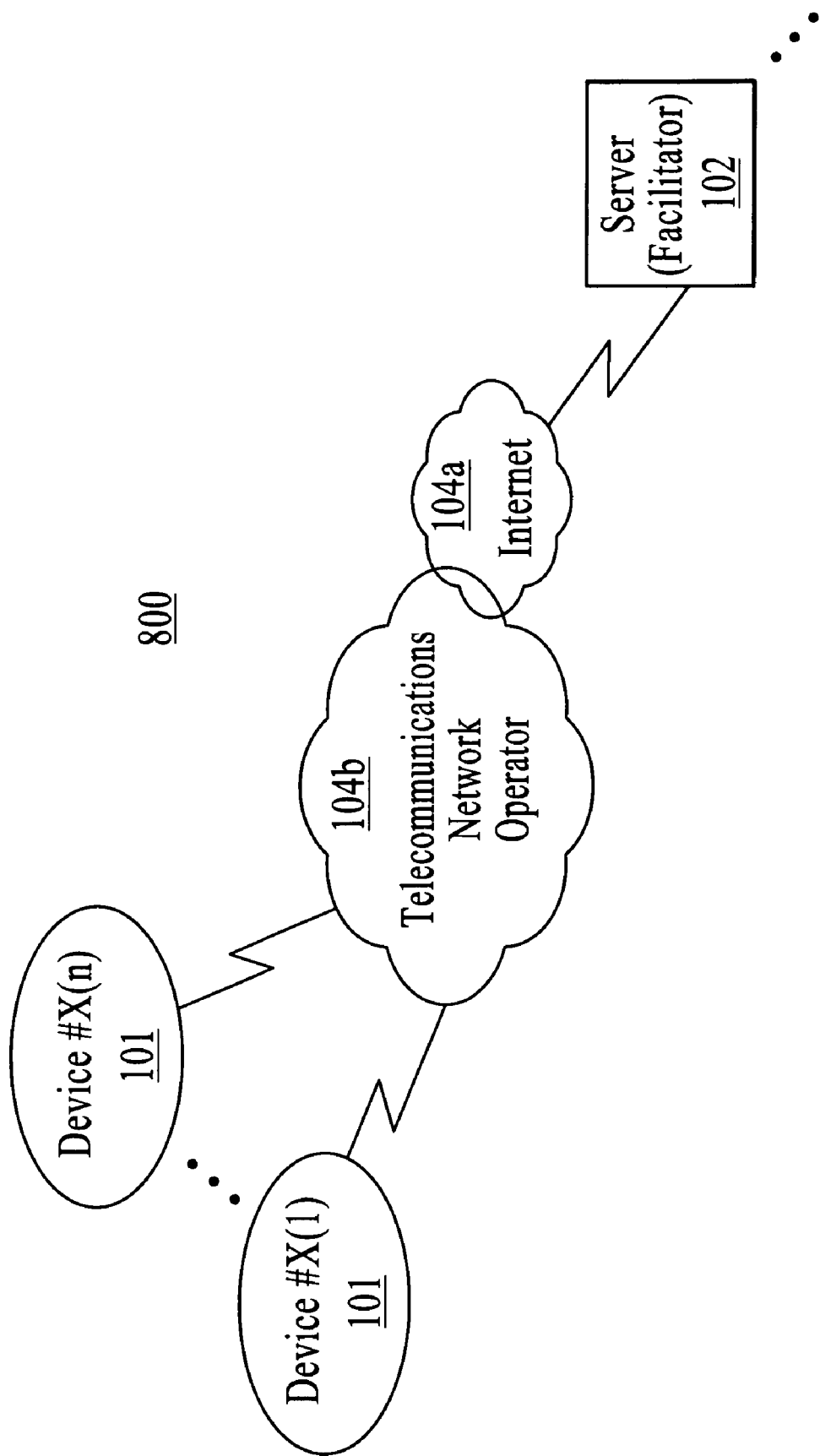
FIG. 8 is a block diagram of an AMC system, under an alternative embodiment.

Some examples follow of alternative AMC system configurations that include the facilitator and client described above. FIG. 8 is a block diagram of an AMC system 800, under an alternative embodiment. The AMC system 800 includes a server or other processor-based device hosting the facilitator 102. The facilitator 102 communicates with one or more client devices 101 to provide AMC system functions among the client devices 101 via network couplings that include the Internet 104a and a telecommunications network 104b. The telecommunications network 104b includes, for example, a cellular telephone network or a public switched telephone network (PTSN), but can be other voice and data communication networks as known in the art. The cellular telephone network can use communication protocols that include, for example, Global System for Mobile communication (GSM), General Packet Radio Service (GPRS), Code Division Multiple Access (CDMA), and Time Division Multiple Access (TDMA), but are not so limited.

Figure 9:
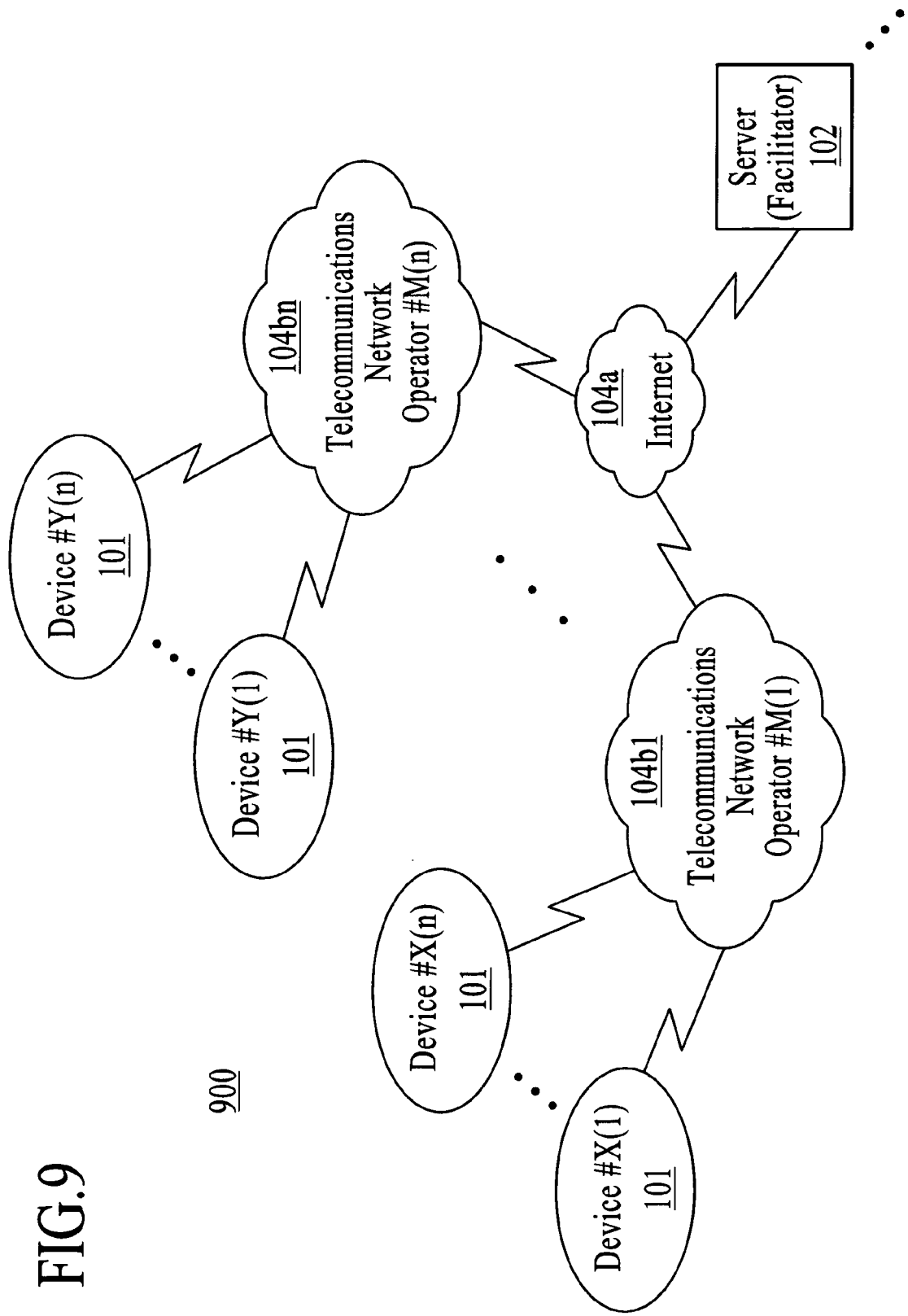
FIG. 9 is a block diagram of an AMC system, under another alternative embodiment.

FIG. 9 is a block diagram of an AMC system 900, under another alternative embodiment. The AMC system 900 includes a server hosting the facilitator 102, and the facilitator 102 communicates with one or more client devices 101 to provide AMC system functions among the client devices 101 via network couplings that include the Internet 104a and/or multiple telecommunications networks 104b1 to 104bn. The telecommunications networks 104b1-104bn are as described above with reference to FIG. 8, but are not so limited.

Figure 10:
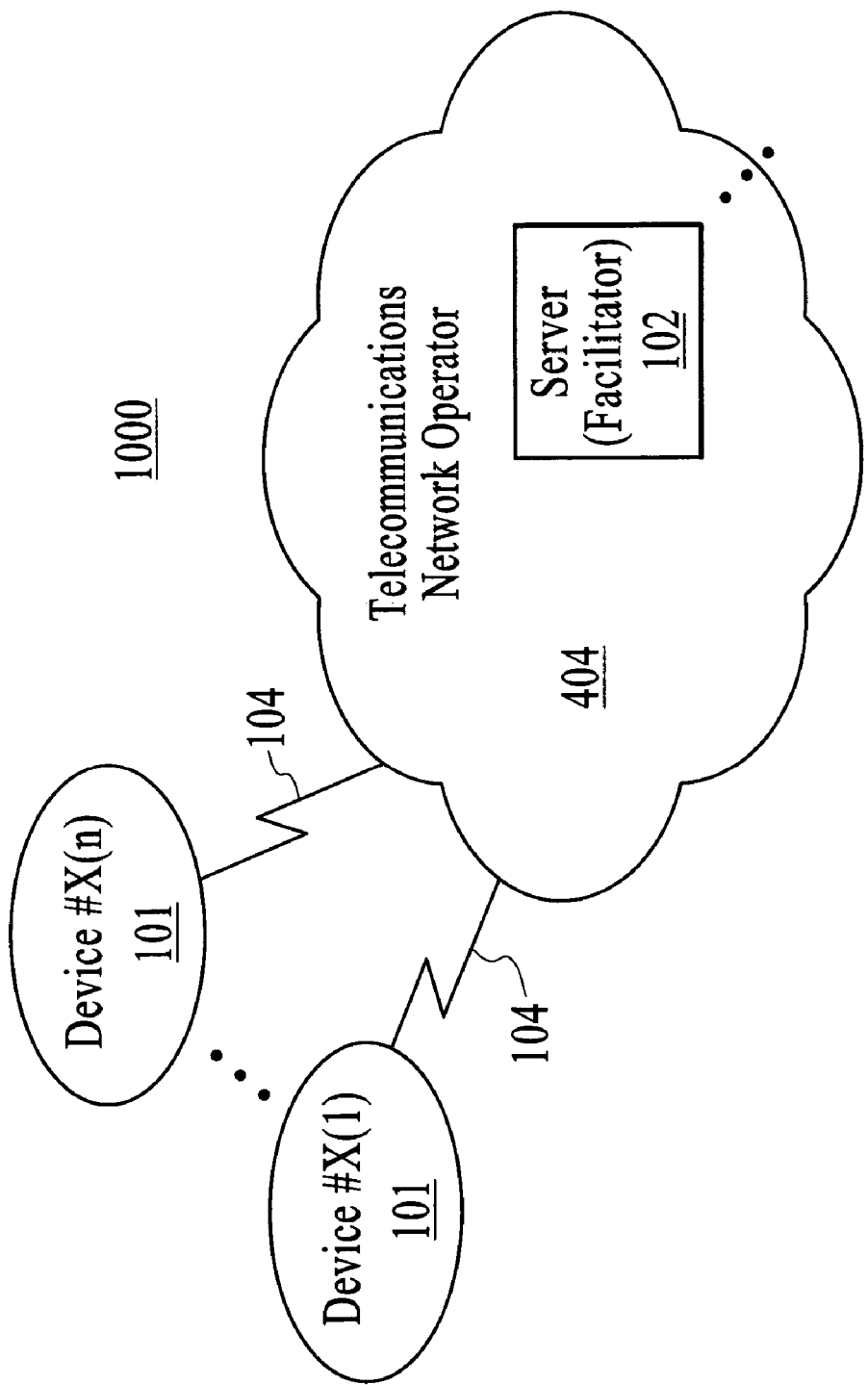
FIG. 10 is a block diagram of an AMC system, under yet another alternative embodiment.

FIG. 10 is a block diagram of an AMC system 1000, under yet another alternative embodiment. The AMC system 1000 includes a server hosting the facilitator 102, and the server/facilitator 102 is a component of a telecommunications network operator infrastructure. The facilitator 102 communicates with one or more client devices 101 to provide AMC system functions among the client devices 101 via network couplings 104, as described above, but is not so limited.

Figure 11:
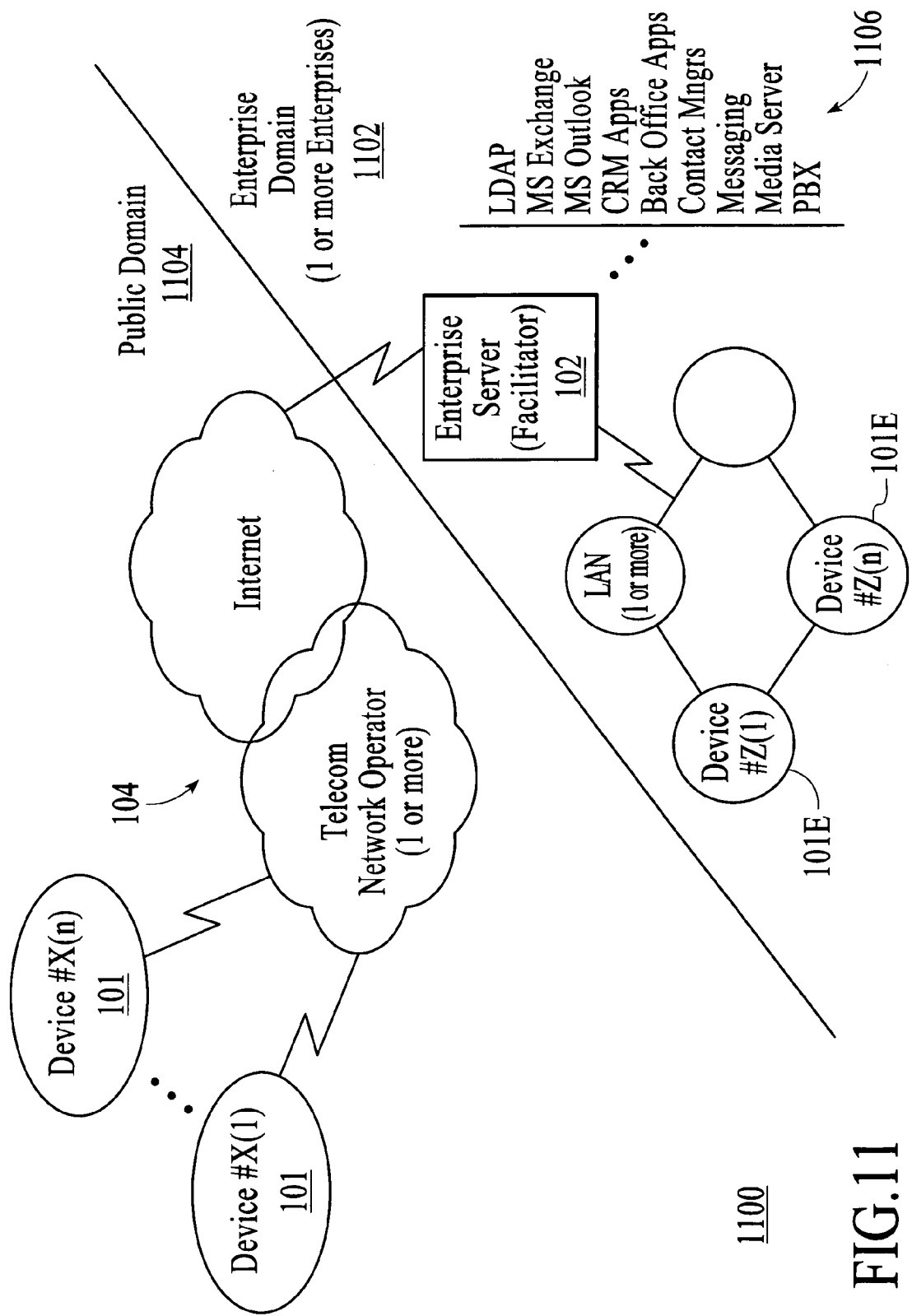
FIG. 11 is a block diagram of an AMC system in an enterprise domain, under another alternative embodiment.

FIG. 11 is a block diagram of an AMC system 1100 in an enterprise domain, under another alternative embodiment. The AMC system 1100 includes a server hosting the facilitator 102 where the server/facilitator 102 is a component of a corporate or enterprise infrastructure 1102. The server can host numerous additional applications 1106 in addition to the facilitator 102 or can be dedicated to the facilitator 102. The facilitator 102 communicates with one or more client devices 101 in the public domain 1104 to provide AMC system functions among the client devices 101 via network couplings 104. The network couplings 104 include, for example, the Internet and one or more telecommunication service provider infrastructures, but can include any number/type of couplings. The facilitator 102 also communicates with one or more client devices 101E in the enterprise domain 1102 to provide AMC system functions among the client devices 101E as described below. The client devices 101E in the enterprise domain 1102 are shown coupled to one or more LANs, but are not so limited.

Figure 12:
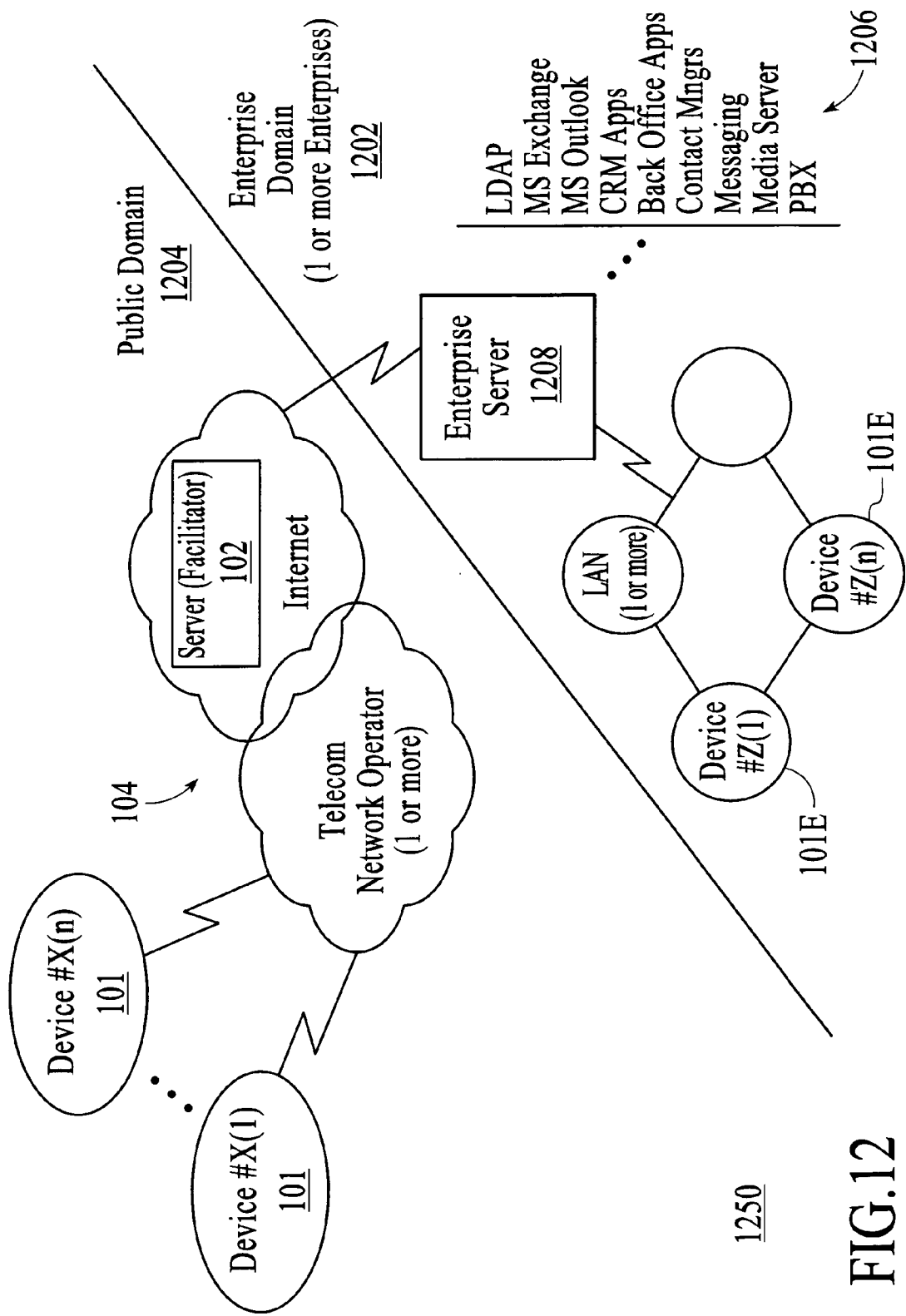
FIG. 12 is a block diagram of an AMC system in a public domain coupled across components of an enterprise domain, under another alternative embodiment.

FIG. 12 is a block diagram of an AMC system 1250 in a public domain coupled across components of an enterprise domain, under another alternative embodiment. The AMC system 1250 includes a server hosting the facilitator 102 where the server/facilitator 102 is a component of a carrier or service provider infrastructure or hosted data center infrastructure for example, but is not so limited. The facilitator 102 communicates with one or more client devices 101 in the public domain 1204 to provide AMC system functions among the client devices 101 via network couplings 104. The network couplings 104 include, for example, the Internet and one or more telecommunication service provider infrastructures, but can include any number/type of couplings. The facilitator 102 also communicates with components of the enterprise domain 1202 including, for example, one or more client devices 101E, one or more enterprise servers 1208, and one or more LANs. The facilitator 102 provides AMC system functions among the client devices 101E as described below. The client devices 101E in the enterprise domain 1202 are shown coupled to one or more LANs, but are not so limited.

As an alternative to the couplings of this AMC system 1200, the facilitator can be hosted on one or more servers (not shown) of the telecommunications network operator. The facilitator of the telecommunications network operator couples to the enterprise servers via local contact servers (not shown) and/or Virtual Private Network (VPN) couplings, but is not so limited.

Figure 13:
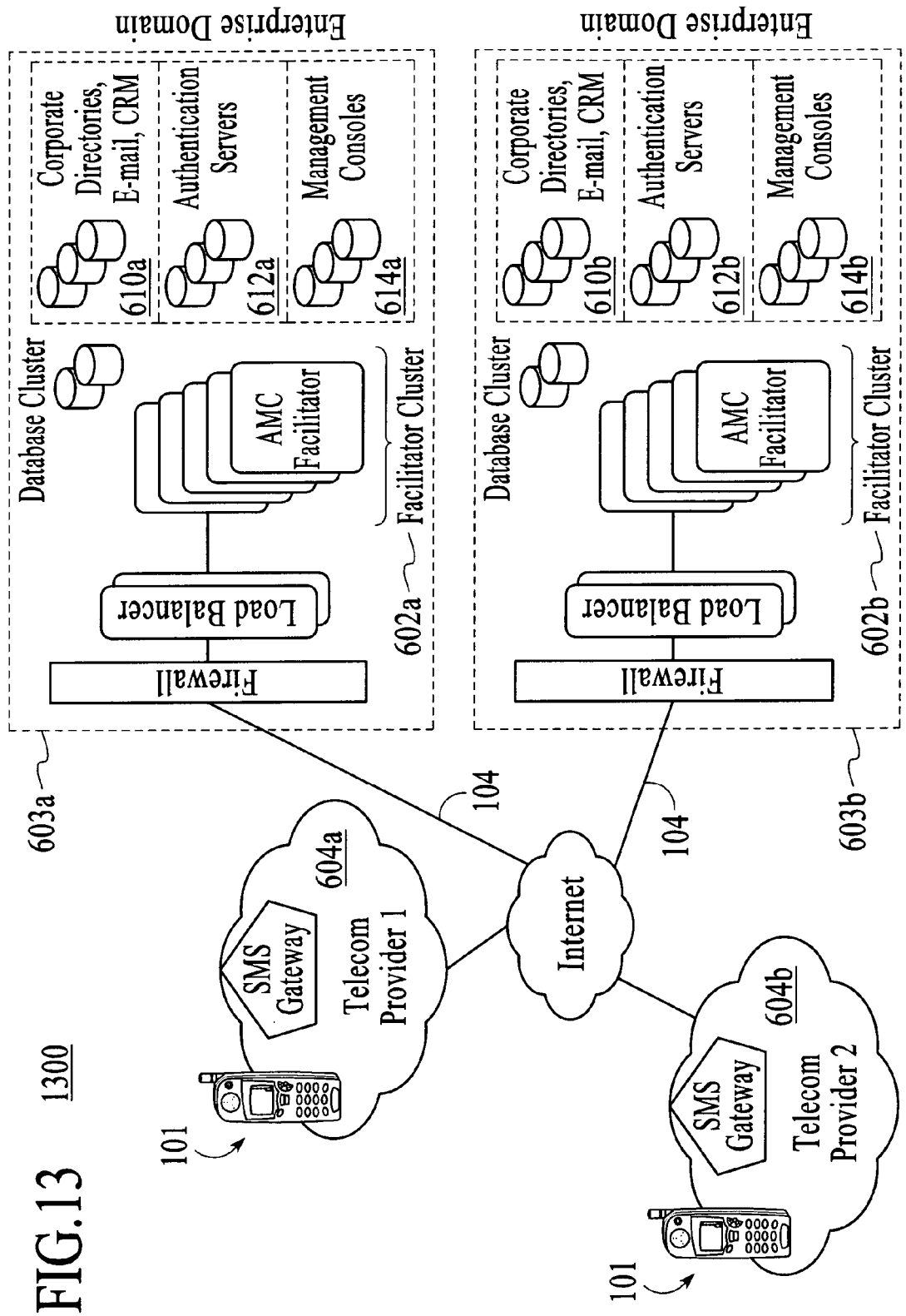
FIG. 13 is a block diagram of an AMC system in an enterprise domain, under still another alternative embodiment.

FIG. 13 is a block diagram of an AMC system 1300 in an enterprise domain, under still another alternative embodiment. The AMC system 1300 includes one or more facilitators that form facilitator clusters 602a and 602b within each of a number of enterprise domains 603a and 603b. Facilitators of the facilitator clusters 602a and 602b communicate with one or more client devices 101 to provide AMC system functions among the client devices 101 via network couplings 104. The network couplings 104 include, for example, at least one of the Internet and multiple telecommunication service providers 604a and 604b, but can include any number/type of couplings. The facilitators also couple with at least one of corporate directory servers and/or electronic mail (email) servers 610a/610b, authentication servers 612a/612b, and management consoles 614a/614b of the enterprise domains 603a/603b, but are not so limited.

Figure 14:
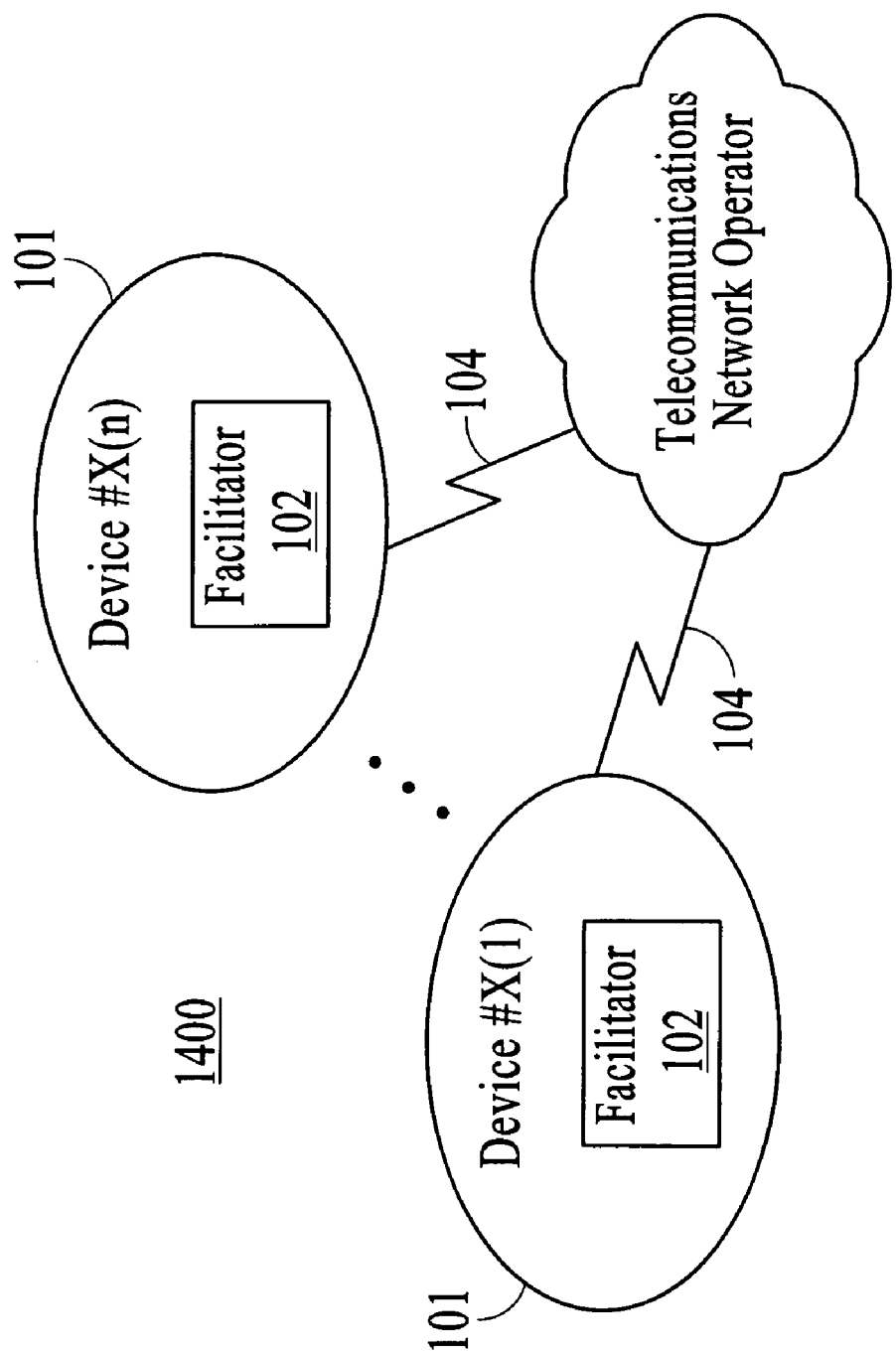
FIG. 14 is a block diagram of an active mobile collaboration (AMC) system, under an embodiment.

FIG. 14 is a block diagram of an active mobile collaboration (AMC) system 1400, under an embodiment. The AMC system 1400 includes any number X(n) of communication devices 101 coupled for communication via one or more facilitators 102 and one or more couplings 104. One or more of the communication devices 101 include an AMC client application. Additionally, one or more of the communication devices 101 include the facilitator 102. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below.

The AMC system components including the facilitator and AMC client described above function to allow users of the client devices or handsets like cellular telephones to quickly coordinate conversations, screen unwanted calls and interruptions and access enterprise directories. Specifically, the AMC system components increase call success rates by dynamically managing how and when mobile calls take place, let users intelligently screen calls based on caller identity, urgency and subject matter, quickly show which contacts are available to talk and which contacts choose not to be disturbed, reduce interruptions while encouraging urgently needed call-backs, and increase accessibility of enterprise and personal contact information from mobile phones.

The communications systems described herein include a method comprising, receiving a message addressed to a client device of a user, determining a category of the message, and determining information to be synchronized and when to synchronize between a server and the client device in response to one or more of the category and one or more user actions at the client device.

In one embodiment of a method, the synchronizing includes immediately synchronizing in response to the message when the message is a first category.

In one embodiment of a method, the synchronizing includes synchronizing in response to a user action at the client device when the message is a second category.

In one embodiment of a method, the user action includes one or more of generating a message at the client device and navigating a user interface of the client device.

An embodiment of the method further comprises re-categorizing messages of one or more types of the second category in response to a communication event initiated at the client device.

An embodiment of the method further comprises re-categorizing messages of one or more types of the second category in response to a search of data of the server initiated at the client device.

In one embodiment of a method, the synchronizing includes synchronizing messages of the second category in response to an action including navigating to a first portion of a user interface of the client device, wherein the messages of the second category correspond to presence data of other users.

In one embodiment of a method, the messages of the second category correspond to the other users having a first presence status.

In one embodiment of a method, the first portion is a communications log page of the user interface.

In one embodiment of a method, the first presence status is an active status, wherein the active status indicates the client device has communicated with the other user during a pre-specified period of time.

In one embodiment of a method, the synchronizing includes synchronizing messages of the second category in response to an action including navigating to a second portion of a user interface of the client device, wherein the messages of the second category correspond to presence data of other users.

In one embodiment of a method, the messages of the second category correspond to other users having one or more of a first presence status and a second presence status.

In one embodiment of a method, the second portion is a contacts list of the user interface.

In one embodiment of a method, the first presence status is an active status and the second presence status is a standby status, wherein the active status indicates the user has communicated via the client device with the other user during a pre-specified period of time, wherein the standby status indicates the user has communicated via the client device with the other user outside the pre-specified period of time.

In one embodiment of a method, the synchronizing includes synchronizing messages of the second category in response to a generated message of the first category being generated at the client device, wherein the messages of the second category correspond to another user having one or more of a first presence status and a second presence status.

In one embodiment of a method, the first presence status is an active status and the second presence status is a standby status, wherein the active status indicates the client device has communicated with the other user during a pre-specified period of time, wherein the standby status indicates the client device has communicated with the other user outside the pre-specified period of time.

In one embodiment of a method, a first category is a high-priority message and a second category is lower priority message relative to the first category, wherein the priority is assigned by the server.

In one embodiment of a method, a first category is one or more of a text message, a telephone call notification message, a contact update message to update contact information, and a notification message of an event.

In one embodiment of a method, a second category is a presence message, wherein the presence message includes information of presence and availability of at least one other user.

In one embodiment of a method, the presence message includes one or more of a presence message corresponding to another user whom a user of the client device is actively monitoring and a presence message corresponding to another user whom a user of the client device excludes from active monitoring.

In one embodiment, the method further comprises placing the message in a first queue when the message is a first category and placing the message in a second queue when the message is a second category.

In one embodiment of a method, the synchronizing includes immediately synchronizing contents of the first queue in response to the message when the message is the first category.

In one embodiment of a method, the synchronizing includes synchronizing contents of the second queue in response to a user action at the client device when the message is a second category.

In one embodiment of a method, synchronizing contents of the second queue includes, moving one or more messages of the second queue to the first queue according to a presence status of another user that corresponds to the message, and synchronizing contents of the first queue.

In one embodiment of a method, the user action includes navigating to a first portion of a user interface of the client device, wherein the presence status is an active status that indicates the client device has communicated with the other user during a pre-specified period of time.

In one embodiment of a method, the user action includes navigating to a second portion of a user interface of the client device, wherein the presence status includes one or more of an active status and a standby status, wherein the active status indicates the client device has communicated with the other user during a pre-specified period of time and the standby status indicates the client device has communicated with the other user outside the pre-specified period of time.

In one embodiment of a method, the user action includes generating a message of the first category at the client device, wherein the presence status includes an active status and a standby status, wherein the active status indicates the client device has communicated with the other user during a pre-specified period of time and the standby status indicates the client device has communicated with the other user outside the pre-specified period of time.

In one embodiment of a method, the user actions occur before the receiving.

In one embodiment of a method, the user actions occur after the receiving.

In one embodiment of a method, the category includes a plurality of message types.

The communications systems described herein further include a method comprising, receiving a message addressed to a client device of a user, and automatically synchronizing the message with the client device in response to one or more of a category of the message and a connection type of the client device.

The communications systems described herein further include a method comprising, receiving a message addressed to a client device of a user, and automatically synchronizing the message between a server and the client device in response to at least one parameter of one or more of the message, the client device, the server, and a connection between the client device and the server.

The communications systems described herein further include a system comprising a rate controller coupled to at least one server and at least one communication network, the rate controller configured to determine a category of a message, wherein the message is directed to a client device of a user configured for operation on the network, the rate controller configured to synchronize the message between the server and the client device in response to one or more of the category and one or more user actions at the client device.

In an embodiment of a system, the synchronizing includes immediately synchronizing in response to the message when the message is a first category.

In an embodiment of a system, the synchronizing includes synchronizing in response to a user action at the client device when the message is a second category.

In an embodiment of a system, the user action includes one or more of generating a message at the client device and navigating a user interface of the client device.

In an embodiment of a system, the rate controller is configured to re-categorize messages of one or more types of the second category in response to one or more of a communication event initiated at the client device and a search of data of the server initiated at the client device.

In an embodiment of a system, the synchronizing includes synchronizing messages of the second category in response to an action including navigating to a first portion of a user interface of the client device, wherein the messages of the second category correspond to presence data of other users.

In an embodiment of a system, the synchronizing includes synchronizing messages of the second category in response to an action including navigating to a second portion of a user interface of the client device, wherein the messages of the second category correspond to presence data of other users.

In an embodiment of a system, the synchronizing includes synchronizing messages of the second category in response to a generated message of the first category being generated at the client device, wherein the messages of the second category correspond to another user having one or more of a first presence status and a second presence status.

In an embodiment of a system, the rate controller is configured to place the message in a first queue when the message is a first category and placing the message in a second queue when the message is a second category.

In an embodiment of a system, the synchronizing includes immediately synchronizing contents of the first queue in response to the message when the message is the first category.

In an embodiment of a system, the synchronizing includes synchronizing contents of the second queue in response to a user action at the client device when the message is a second category.

In an embodiment of a system, synchronizing contents of the second queue includes, moving one or more messages of the second queue to the first queue according to a presence status of another user that corresponds to the message, and synchronizing contents of the first queue.

In an embodiment of a system, the user action includes navigating to a first portion of a user interface of the client device, wherein the presence status is an active status that indicates the client device has communicated with the other user during a pre-specified period of time.

In an embodiment of a system, the user action includes navigating to a second portion of a user interface of the client device, wherein the presence status includes one or more of an active status and a standby status, wherein the active status indicates the client device has communicated with the other user during a pre-specified period of time and the standby status indicates the client device has communicated with the other user outside the pre-specified period of time.

In an embodiment of a system, the user action includes generating a message of the first category at the client device, wherein the presence status includes an active status and a standby status, wherein the active status indicates the client device has communicated with the other user during a pre-specified period of time and the standby status indicates the client device has communicated with the other user outside the pre-specified period of time.

The communications systems described herein further include a computer readable media including executable instructions which, when executed in a processing system, provides rate control by, receiving a message addressed to a client device of a user, determining a category of the message, and determining information to be synchronized and when to synchronize between a server and the client device in response to one or more of the category and one or more user actions at the client device.

The communications systems described herein include a method comprising, monitoring a connection mode of a client device connected to a server, and setting a reachable state of the client device in response to data of the connection mode.

In an embodiment, the method further comprises selecting one of a plurality of connection modes for the connection between the client device and the server, the selecting according to one or more parameters of at least one of the client device and the server.

In an embodiment of a method, the one or more parameters include one or more of server capability, connection bandwidth, connection stability, connection reliability, service provider, server access pricing plans, device model, and device battery life.

In an embodiment, the method further comprises setting one or more of an availability state and a presence state of a user of the client device according to the reachable state.

In an embodiment of a method, monitoring each connection mode includes tracking elapsed time since a communication event of the connection.

In an embodiment of a method, the communication event includes one or more of a connect event, a disconnect event, a logout event, a login event, an authentication event, and a message transfer between the client device and the server.

In an embodiment of a method, setting the reachable state includes setting the reachable state to unreachable when the elapsed time exceeds a time period in the absence of the communication event.

In an embodiment, the method further comprises setting one or more of an availability state and a presence state of a user of the client device according to the reachable state.

In an embodiment of a method, the plurality of connection modes includes a persistent connection.

In an embodiment of a method, the monitoring includes tracking elapsed time since a communication event of the connection.

In an embodiment of a method, setting the reachable state includes setting the reachable state to unreachable when the elapsed time exceeds a time period in the absence of a connection event.

In an embodiment, the method further comprises setting one or more of an availability state and a presence state of a user of the client device to the unavailable state.

In an embodiment of a method, the plurality of connection modes includes a polling mode.

In an embodiment of a method, the monitoring includes tracking elapsed time since a communication event of the connection.

In an embodiment of a method, setting the reachable state includes setting the reachable state to unreachable when the elapsed time exceeds a time period in the absence of a connection event.

In an embodiment of a method, the plurality of connection modes includes a message wakeup mode, wherein the server sends a wakeup message to the client device.

In an embodiment of a method, the monitoring includes, transmitting an electronic message to the client device, and tracking elapsed time since the transmitting.

In an embodiment of a method, setting the reachable state includes setting the reachable state to unreachable when the elapsed time exceeds a time period in the absence of a connection event with the client device.

In an embodiment of a method, the message is a Short Message Service (SMS) message.

The communications systems described herein further include a method comprising, selecting one of a plurality of connection modes for a connection between a client device and the server according to one or more parameters of at least one of the client device and the server, and setting a reachable state of each client device in response to data of each connection mode.

In an embodiment of a method, the one or more parameters include one or more of server capability, connection bandwidth, connection stability, connection reliability, service provider server access pricing plans, device model, and device battery life.

In an embodiment, the method further comprises setting one or more of an availability state and a presence state of a user of the client device according to the reachable state.

In an embodiment, the method further comprises monitoring each connection mode of each client device connected to the server.

In an embodiment of a method, monitoring each connection mode includes tracking elapsed time since a communication event of the connection.

In an embodiment of a method, the communication event includes one or more of a connect event, a disconnect event, and a message transfer between the client device and the server.

In an embodiment of a method, setting the reachable state includes setting the reachable state to unreachable when the elapsed time exceeds a time period in the absence of the communication event.

The communications systems described herein further include a system comprising, a server, wherein the server is coupled to an enterprise and a communication server that includes a plurality of client devices, and a connection management component coupled to the server and configured to use a plurality of connection modes to control a connection between the server and the plurality of client devices, wherein the connection management component is configured to monitor each connection mode of each client device connected to the server, wherein the connection management component is configured to set a reachable state of each client device in response to data of each respective connection mode.

In an embodiment, of a system, the connection management component is configured to select one of a plurality of connection modes for the connection between the client device and the server, the selecting according to one or more parameters of at least one of the client device and the server.

In an embodiment, of a system, the one or more parameters include one or more of server capability, connection bandwidth, connection stability, connection reliability, service provider, server access pricing plans, device model, and device battery life.

In an embodiment, of a system, the connection management component is configured to set one or more of an availability state and a presence state of a user of the client device according to the reachable state.

In an embodiment, of a system, monitoring each connection mode includes tracking elapsed time since a communication event of the connection.

In an embodiment, of a system, the communication event includes one or more of a connect event, a disconnect event, a logout event, a login event, an authentication event, and a message transfer between the client device and the server.

In an embodiment, of a system, setting the reachable state includes setting the reachable state to unreachable when the elapsed time exceeds a time period in the absence of the communication event.

In an embodiment, of a system, the connection management component is configured to set one or more of an availability state and a presence state of a user of the client device according to the reachable state.

In an embodiment, of a system, the plurality of connection modes includes a persistent connection, wherein the monitoring includes tracking elapsed time since a communication event of the connection, wherein setting the reachable state includes setting the reachable state to unreachable when the elapsed time exceeds a time period in the absence of a connection event.

In an embodiment, of a system, the connection management component is configured to set one or more of an availability state and a presence state of a user of the client device to the unavailable state.

In an embodiment, of a system, the plurality of connection modes includes a polling mode, wherein the monitoring includes tracking elapsed time since a communication event of the connection, wherein setting the reachable state includes setting the reachable state to unreachable when the elapsed time exceeds a time period in the absence of a connection event.

In an embodiment, of a system, the plurality of connection modes includes a message wakeup mode, wherein the server sends a wakeup message to the client device.

In an embodiment, of a system, the monitoring includes, transmitting an electronic message to the client device, and tracking elapsed time since the transmitting.

In an embodiment, of a system, setting the reachable state includes setting the reachable state to unreachable when the elapsed time exceeds a time period in the absence of a connection event with the client device.

The communications systems described herein include a computer readable media including executable instructions which, when executed in a processing system, manages connections in communication systems by, monitoring a connection mode of a client device connected to a server, and setting a reachable state of the client device in response to data of the connection mode.

Aspects of the communications systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the communications systems include: microcontrollers with memory (such as electronically erasable programmable read-only memory (EEPROM)), embedded microprocessors, firmware, software, etc. Furthermore, aspects of the communications systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the communications systems is not intended to be exhaustive or to limit the systems and methods described to the precise form disclosed. While specific embodiments of, and examples for, the communications systems are described herein for illustrative purposes, various equivalent modifications are possible within the scope of other communications systems and methods, as those skilled in the relevant art will recognize. The teachings of the communications systems provided herein can be applied to other processing systems and methods, not only for the systems and methods described above.

The elements and acts of the various embodiments described above can be combined to provide further embodiments. These and other changes can be made to the communications systems in light of the above detailed description.

In general, in the following claims, the terms used should not be construed to limit the communications systems to the specific embodiments disclosed in the specification and the claims, but should be construed to include all systems that operate under the claims. Accordingly, the communications systems is not limited by the disclosure, but instead the scope of the communications systems is to be determined entirely by the claims.

While certain aspects of the communications systems are presented below in certain claim forms, the inventors contemplate the various aspects of the communications systems in any number of claim forms. Accordingly, the inventors reserve the right to add additional claims after filing the application to pursue such additional claim forms for other aspects of the communications systems.

What is claimed is:

1. A method comprising:
   storing, in a plurality of disparate directory databases, contact data associated with each of a plurality of client devices, wherein the contact data includes at least one predetermined criterion associated with synchronization of message for each of the plurality of client devices;
   aggregating the plurality of disparate directory databases into an integrated directory associated with each of the plurality of client devices;
   receiving a plurality of messages comprising data for at least one of the plurality of client devices in accordance with stored contact data associated therewith;
   determining a category associated with a content type of each of the messages;
   determining a device context state for the at least one client device selected from a first device context state and a second device context state;
   synchronizing the at least one client device with data from messages having a category meeting a predetermined criterion associated with the stored contact data corresponding to the at least one client device responsive to determining the at least one client device being in one of a group consisting of the first device context state and the second device context state;

synchronizing the at least one client device with data from messages that do not meet the predetermined criterion associated with the stored contact data corresponding to the at least one client device responsive to determining the client device is in the first context state; and queuing messages for future synchronization with the at least one client device that do not meet the predetermined criterion associated with the stored contact data and responsive to determining the at least one client device is in the second context state until the client device is in the first context state.

2. The method of claim 1, wherein the synchronizing includes immediately synchronizing messages in a first category.

3. The method of claim 1, wherein the synchronizing includes synchronizing in response to a predefined activity at the client device when the message is a second category.

4. The method of claim 3, wherein the predefined activity includes one or more of generating a message at the client device and navigating a user interface of the client device.

5. The method of claim 3, comprising re-categorizing messages of one or more types of the second category in response to a communication event initiated at the client device.

6. The method of claim 3, comprising re-categorizing messages of one or more types of the second category in response to a search of data of the server initiated at the client device.

7. The method of claim 3, wherein the synchronizing includes synchronizing messages of the second category in response to an action including navigating to a first portion of a user interface of the client device, wherein the messages of the second category correspond to presence data of other users.

8. The method of claim 7, wherein the messages of the second category correspond to the other users having a first presence status.

9. The method of claim 7, wherein the first portion is a communications log page of the user interface.

10. The method of claim 7, wherein the first presence status is an active status, wherein the active status indicates the client device has communicated with the other user during a pre-specified period of time.

11. The method of claim 3, wherein the synchronizing includes synchronizing messages of the second category in response to an action including navigating to a second portion of a user interface of the client device, wherein the messages of the second category correspond to presence data of other users.

12. The method of claim 11, wherein the messages of the second category correspond to other users having one or more of a first presence status and a second presence status.

13. The method of claim 11, wherein the second portion is a contacts list of the user interface.

14. The method of claim 11, wherein the first presence status is an active status and the second presence status is a standby status, wherein the active status indicates the user has communicated via the client device with the other user during a pre-specified period of time, wherein the standby status indicates the user has communicated via the client device with the other user outside the pre-specified period of time.

15. The method of claim 3, wherein the synchronizing includes synchronizing messages of the second category in response to a generated message of the first category being generated at the client device, wherein the messages of the second category correspond to another user having one or more of a first presence status and a second presence status.

16. The method of claim 15, wherein the first presence status is an active status and the second presence status is a standby status, wherein the active status indicates the client device has communicated with the other user during a pre-specified period of time, wherein the standby status indicates the client device has communicated with the other user outside the pre-specified period of time.

17. The method of claim 1, wherein a first category is a high-priority message and a second category is lower priority message relative to the first category, wherein the priority is assigned by the server.

18. The method of claim 1, wherein a first category is one or more of a text message, a telephone call notification message, a contact update message to update contact information, and a notification message of an event.

19. The method of claim 1, wherein a second category is a presence message, wherein the presence message includes information of presence and availability of at least one other user.

20. The method of claim 19, wherein the presence message includes one or more of a presence message corresponding to another user whom a user of the client device is actively monitoring and a presence message corresponding to another user whom a user of the client device excludes from active monitoring.

21. The method of claim 1, further comprising placing the message in a first queue when the message is a first category and placing the message in a second queue when the message is a second category.

22. The method of claim 21, wherein the synchronizing includes immediately synchronizing contents of the first queue in response to the message when the message is the first category.

23. The method of claim 1, wherein the synchronizing includes synchronizing contents of the second queue in response to a user action at the client device when the message is a second category.

24. The method of claim 23, wherein synchronizing contents of the second queue includes:

moving one or more messages of the second queue to the first queue according to a presence status of another user that corresponds to the message; and synchronizing contents of the first queue.

25. The method of claim 24, wherein the user action includes navigating to a first portion of a user interface of the client device, wherein the presence status is an active status that indicates the client device has communicated with the other user during a prespecified period of time.

26. The method of claim 24, wherein the user action includes navigating to a second portion of a user interface of the client device, wherein the presence status includes one or more of an active status and a standby status, wherein the active status indicates the client device has communicated with the other user during a pre-specified period of time and the standby status indicates the client device has communicated with the other user outside the pre-specified period of time.

27. The method of claim 24, wherein the user action includes generating a message of the first category at the client device, wherein the presence status includes an active status and a standby status, wherein the active status indicates the client device has communicated with the other user during a pre-specified period of time and the standby status indicates the client device has communicated with the other user outside the prespecified period of time.

28. The method of claim 1, wherein the user actions occur before the receiving.

29. The method of claim 1, wherein the user actions occur after the receiving.

30. The method of claim 1, wherein the category includes a plurality of message types.

31. A system comprising a rate controller coupled to at least one server and at least one communication network, the rate controller configured to access, in a plurality of disparate directory databases stored on the at least one server, contact data associated with each of a plurality of client devices, wherein the contact data includes at least one predetermined criterion associated with synchronization of message for each of the plurality of client devices;
  wherein the rate controller is configured to aggregate the plurality of disparate directory databases into an integrated directory associated with each of the plurality of client devices;
  wherein the rate controller configured to determine a category associated with a content type for each of a plurality of messages comprising data for at least one of the plurality of client devices received at the server;
  wherein the rate controller is configured to determine whether the at least one client device is in one of a group consisting of a first device context state and a second device context state;
  wherein the rate controller is configured to synchronize the at least one client device with data from messages having a category meeting a predetermined criterion associated with the stored contact data corresponding to the client device responsive to determining that the client device is in one of a group consisting of the first device context state and the second device context state;
  wherein the rate controller is configured to synchronize the at least one client device with data from messages that do not meet the predetermined criterion associated with the stored contact data corresponding to the client device responsive to determining the client device is in the first device context state; and
  wherein the rate controller is configured store data in a queue for future synchronization with the at least one client device from messages that do not meet the predetermined criterion associated with the stored contact data and determining the at least one client device is in the second device context state until determining the client device is in the first device context state.

32. The system of claim 31, wherein the synchronizing includes immediately synchronizing in response to the message when the message is a first category.

33. The system of claim 31, wherein the rate controller determines the client device is in the first device context state in response to a user action at the client device when the message is a second category.

34. The system of claim 33, wherein the user action includes one or more of generating a message at the client device and navigating a user interface of the client device.

35. The system of claim 33, wherein the rate controller is configured to re-categorize messages of one or more types of the second category in response to one or more of a communication event initiated at the client device and a search of data of the server initiated at the client device.

36. The system of claim 33, wherein the rate controller synchronizes messages of the second category with the client device in response to an action including navigating to a first portion of a user interface of the client device, wherein the messages of the second category correspond to presence data of other users.

37. The system of claim 33, wherein the rate controller synchronizes messages of the second category in response to an action including navigating to a second portion of a user interface of the client device, wherein the messages of the second category correspond to presence data of other users.

38. The system of claim 33, wherein the rate controller synchronizes messages of the second category in response to a generated message of the first category being generated at the client device, wherein the messages of the second category correspond to another user having one or more of a first presence status and a second presence status.

39. The system of claim 31, wherein the rate controller is configured to place the message in a first queue when the message is a first category and placing the message in a second queue when the message is a second category.

40. The system of claim 39, wherein the rate controller immediately synchronizes contents of the first queue in response to the message when the message is the first category.

41. The system of claim 31, wherein the rate controller synchronizes contents of the second queue in response to a user action at the client device when the message is a second category.

42. The system of claim 41, wherein synchronizing contents of the second queue by the rate controller includes:
  moving one or more messages of the second queue to the first queue according to a presence status of another user that corresponds to the message; and
  synchronizing contents of the first queue.

43. The system of claim 42, wherein the user action includes navigating to a first portion of a user interface of the client device, wherein the presence status is an active status that indicates the client device has communicated with the other user during a prespecified period of time.

44. The system of claim 42, wherein the user action includes navigating to a second portion of a user interface of the client device, wherein the presence status includes one or more of an active status and a standby status, wherein the active status indicates the client device has communicated with the other user during a pre-specified period of time and the standby status indicates the client device has communicated with the other user outside the pre-specified period of time.

45. The system of claim 42, wherein the user action includes generating a message of the first category at the client device, wherein the presence status includes an active status and a standby status, wherein the active status indicates the client device has communicated with the other user during a pre-specified period of time and the standby status indicates the client device has communicated with the other user outside the prespecified period of time.

46. An apparatus, comprising:
  means for storing, in a plurality of disparate directory databases, contact data associated with each of a plurality of client devices, wherein the contact data includes at least one predetermined criterion associated with synchronization of message for each of the plurality of client devices;
  means for aggregating the plurality of disparate directory databases into an integrated directory associated with each of the plurality of client devices;
  means for receiving a plurality of messages comprising data for at least one of the plurality of client devices;

means for determining a device context state for the at least one client device;

means for determining a category associated with a content type of each of the messages;

means for synchronizing the client with data from messages having a category meeting a predetermined criterion associated with the stored contact data corresponding to the at least one client device responsive to determining the client being in one of a group consisting of the first device context state and the second device context state;

means for synchronizing the at least one client device with data from messages that do not meet the predetermined criterion associated with the stored contact data corresponding to the at least one client device responsive to determining the client device is in the first device context state; and means for queuing messages for future synchronization with the at least one client device that do not meet the predetermined criterion associated with the stored contact data and determining the at least one client device is in the second device context state until the client device is in the first device context state.

\* \* \* \* \*